(12) United States Patent
Nguyen et al.

(10) Patent No.: US 7,796,829 B2
(45) Date of Patent: Sep. 14, 2010

(54) METHOD AND SYSTEM FOR FORMING AN IMAGE WITH ENHANCED CONTRAST AND/OR REDUCED NOISE

(75) Inventors: Lam Huy Nguyen, Laurel, MD (US); Jeffrey P. Sichina, Ocean View, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/331,888

(22) Filed: Dec. 10, 2008

(65) Prior Publication Data

US 2010/0141508 A1 Jun. 10, 2010

(51) Int. Cl.
*G06K 9/40* (2006.01)
(52) U.S. Cl. .................................... 382/260; 342/26 R
(58) Field of Classification Search .................. 382/260; 342/26 R
See application file for complete search history.

(56) References Cited

U.S. PATENT DOCUMENTS

| 5,111,823 | A | 5/1992 | Cohen |
| 5,465,722 | A | 11/1995 | Fort et al. |
| 5,805,098 | A | 9/1998 | McCorkle |
| 6,400,306 | B1 | 6/2002 | Nohara et al. |
| 7,538,712 | B2 | 5/2009 | Allen et al. |
| 2005/0030393 | A1 | 2/2005 | Tull |
| 2005/0129324 | A1* | 6/2005 | Lemke ........................ 382/254 |

OTHER PUBLICATIONS

John W. McCorkle, "Focusing of Synthetic Aperture Ultra Wideband Data," IEEE Int'l Conf on Systems Engineering, Aug., 1992, p. 1-5.
John W. McCorkle and Lam Nguyen, "Focusing of Dispersive Targets Using Synthetic Aperture Radar," ARL-TR-305, Aug., 1994.
Lam Nguyen, "Signal Processing Technique to Remove Signature Distortion in ARL Synchronous Impulse Reconstruction (SIRE) Ultra-Wideband (UWB) Radar," ARL-TR-4404, Mar. 2008.

(Continued)

*Primary Examiner*—Thomas H Tarcza
*Assistant Examiner*—Timothy A Brainard
(74) *Attorney, Agent, or Firm*—Lawrence E. Anderson

(57) ABSTRACT

A method and system for generating images from projection data; a preferred embodiment comprising inputting projection data from at least one receiving element; generating a first aperture or array of data points containing positional and signal data; arbitrarily and/or randomly removing data points from the first array to form a series of subarrays comprising different sets of data points; generating preliminary images from the subarrays; comparing the corresponding image pixels from two preliminary images to determine for each pixel location the lesser or equal pixel values; forming a merged image from the lesser or equal pixel values; and repeating the comparison of corresponding image pixels of another preliminary image to the merged image to determine the lesser or equal pixel values until a merged image of the desired quality is obtained. A preferred embodiment of the system may comprise at least one processor, comparator and/or image generator.

20 Claims, 15 Drawing Sheets
(10 of 15 Drawing Sheet(s) Filed in Color)

OTHER PUBLICATIONS

Mark A. Schulze, et al. "Noise Reduction in Synthetic Aperture Radar Imagery using a Morphology-Based Nonlinear Filter," in Proceedings of DICTA96, Digital Image Computing: Techniques and Applications (Conference of the Australian Pattern Recognition Society, Brisbane, Australia), pp. 661-666 (Dec. 6-8,1995 draft downloaded from Google Scholar).

Richard Rau, et al. "Analytic Models and Postprocessing Techniques for UWB SAR," IEE Transactions on Aerospace and Electronic Systems, vol. 36, No. 4, Oct. 2000.

R. Stolt, "Migration by Fourier Transform," Geophysics, vol. 43, p. 23ff.

F. Rocca, C. Cafforio, and C. Prati, "Synthetic Aperture Radar: A New Application for Wave Equation Techniques," Geophysical Prospecting, vol. 37, 1989, pp. 809 —30.

C. Cafforio, C. Prati, and F. Rocca, "SAR Data Focusing Using Seismic Migration Techniques," IEEE Transactions on Aerospace and Electronic Systems, vol. AES-27, No. 2, Mar. 1991, pp. 194—206.

R. Bamler, "A Comparison of Range Doppler and Wavenumber Domain SAR Focusing Algorithms," IEEE Transactions on Geoscience and Remote Sensing, vol. 30, No. 4, Jul. 1, 1992, pp. 706—713.

J. McCorkle and L. Nguyen, "Ultra Wide Bandwidth Synthetic Aperture Radar Focusing of Dispersive Targets," HDL-R- ST-R-92-004, Mar. 1992.

M. Ressler et al., "The Army Research Laboratory Ultra-Wideband Testbed Radars," IEEE 1995 International Radar Conference, Alexandria, VA., May, 1995.

L. Happ et al., "Low-Frequency Ultra-Wideband Synthetic Aperture Radar 1995 BoomSAR Tests," IEEE 1996 National Radar Conference, Ann Arbor, Mich., May, 1996.

M. Ressler, L. Nguyen, F. Koenig, D. Wong, and G. smith, "The Army Research Laboratory (ARL) Synchronous Impluse Reconstriction (SIRE) Forward-Looking Radar", Proceedings of SPIE, Unmanned Systems Technology IX, Apr. 2007.

Lam Nguyen, et al., "Signal Processing Techniques for Forward Imaging Using Ultrawideband Synthetic Aperture Radar," Proceedings of SPIE, vol. 5083, Unmanned Ground Vehicle Technology V, Sep. 2003, pp. 505-518.

* cited by examiner

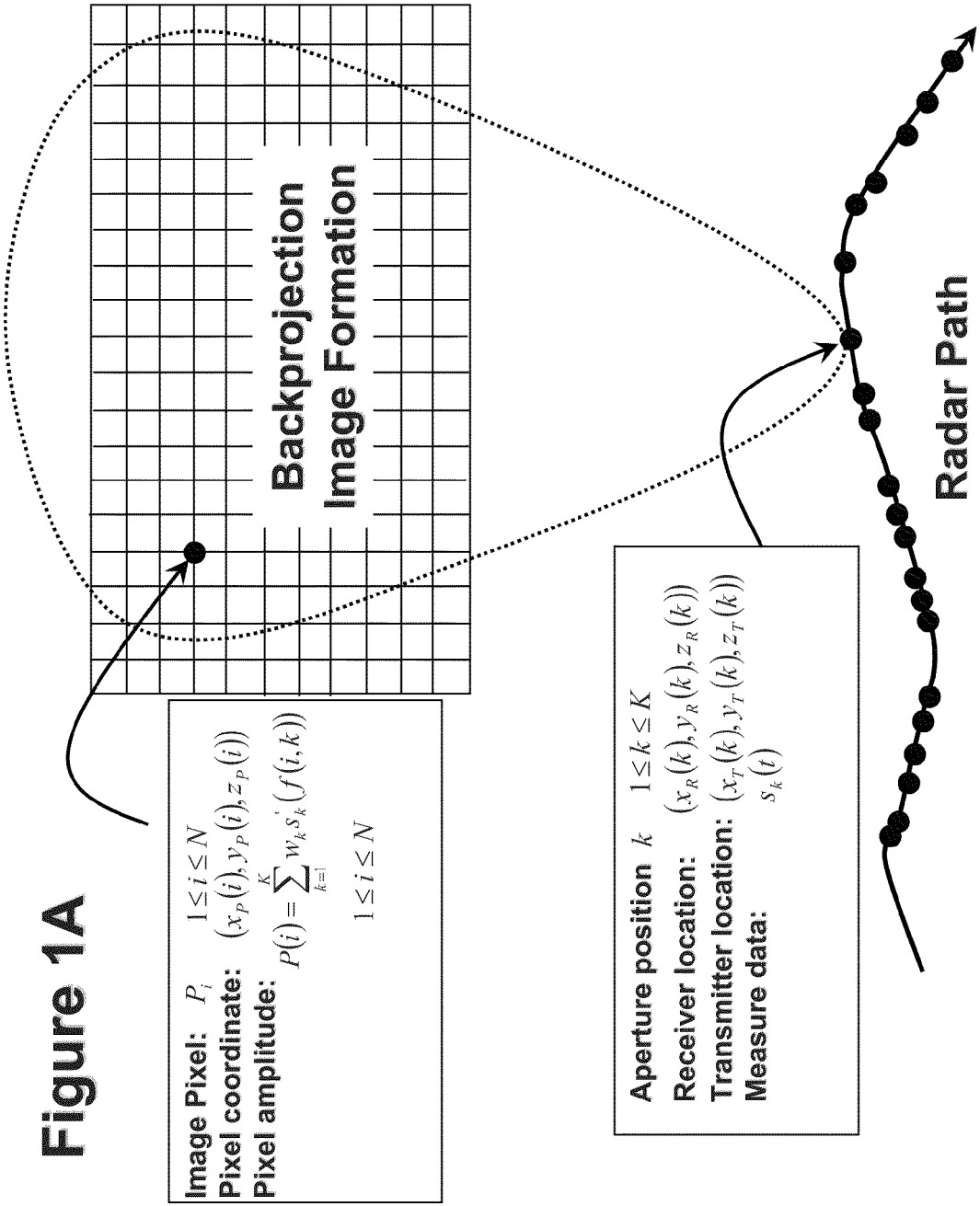

FIGURE 6  NOTE: L<K; each iteration contains a randomly chosen subset of the number of positions of the original apertures Figure 7 - Generate a subset of original radar aperture for each iteration

COMPARISON OF CROSS RANGE PROFILES

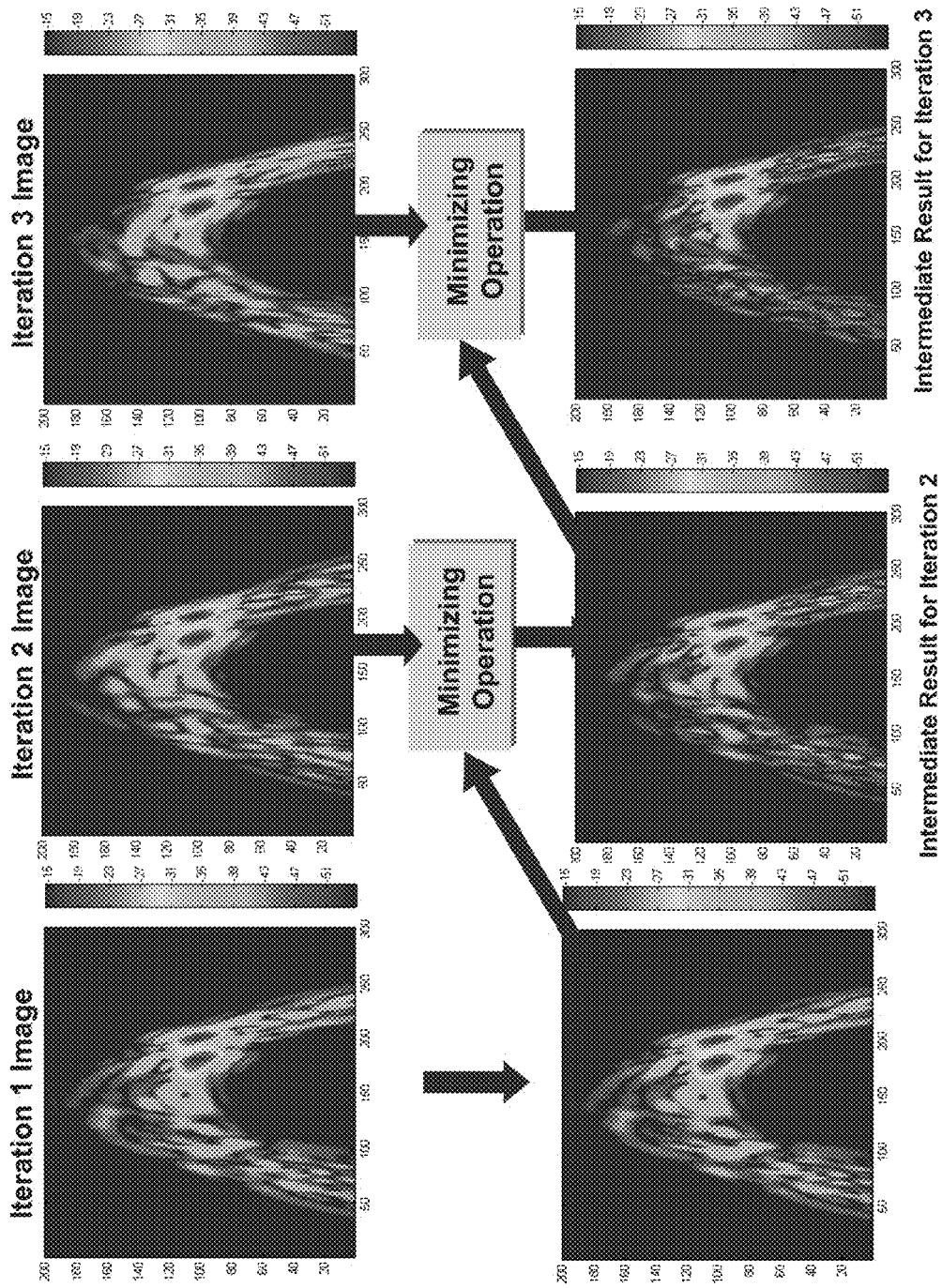

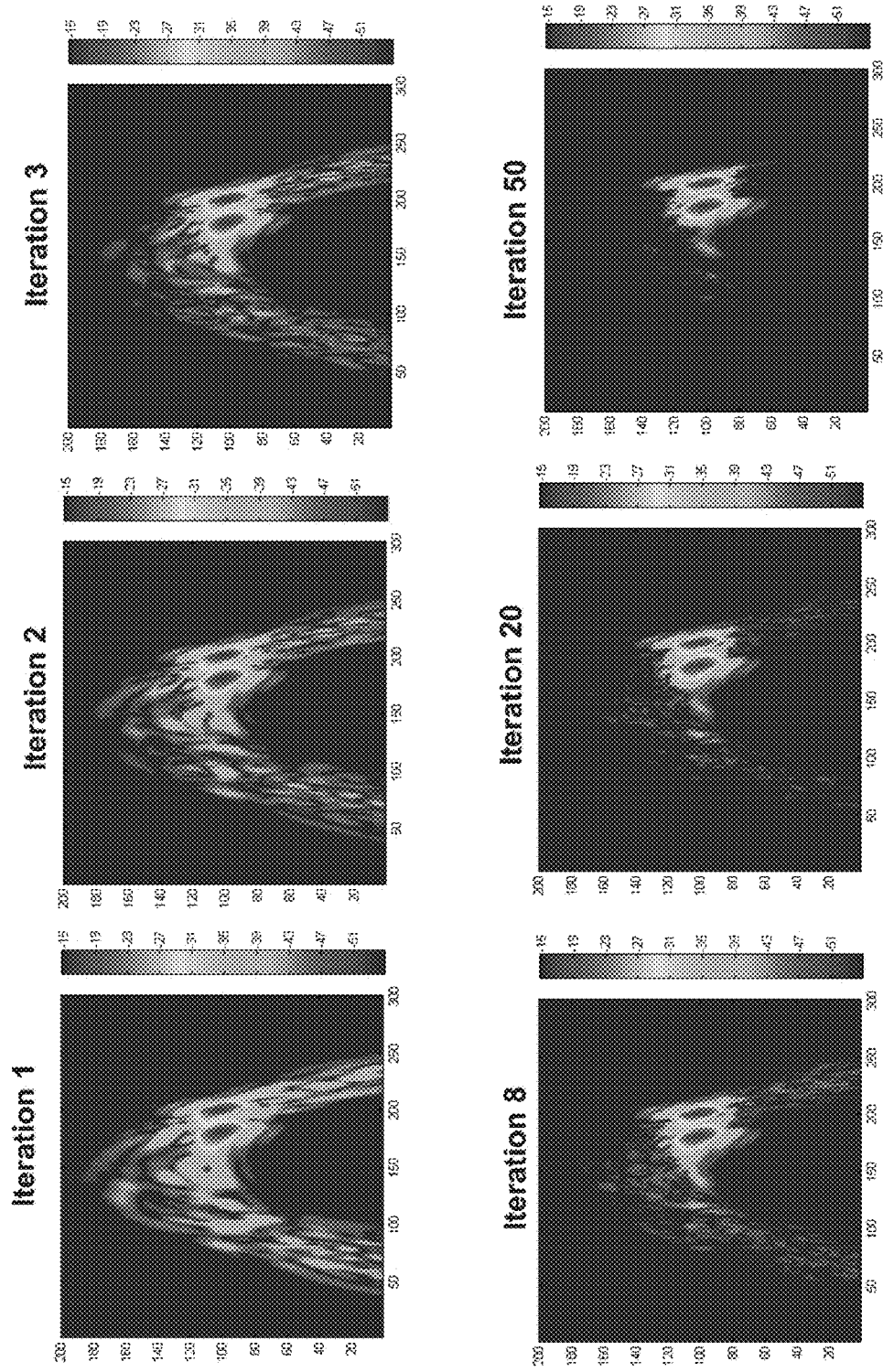

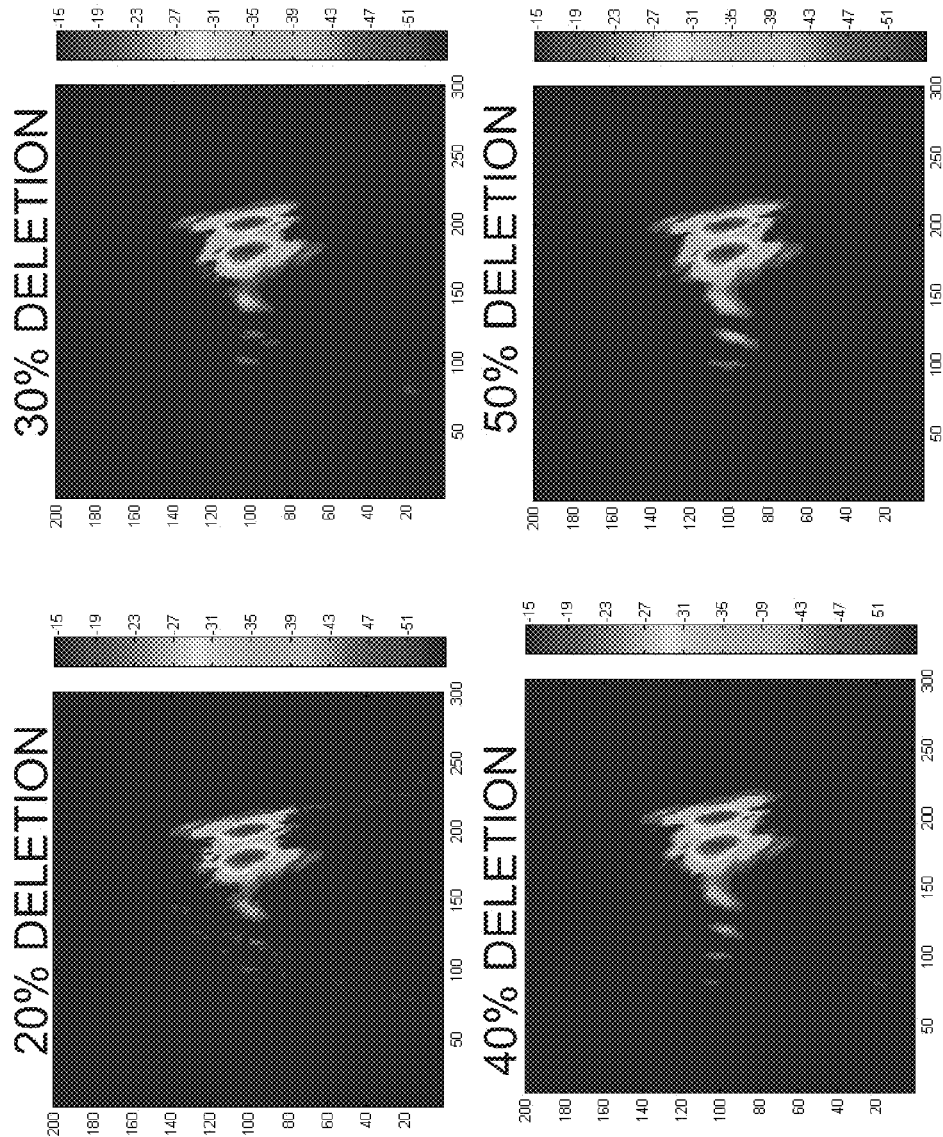
FIGURE 11A COMPARISON OF IMAGES DEVELOPED FROM VARYING PERCENTAGES OF DELETED DATA POINTS

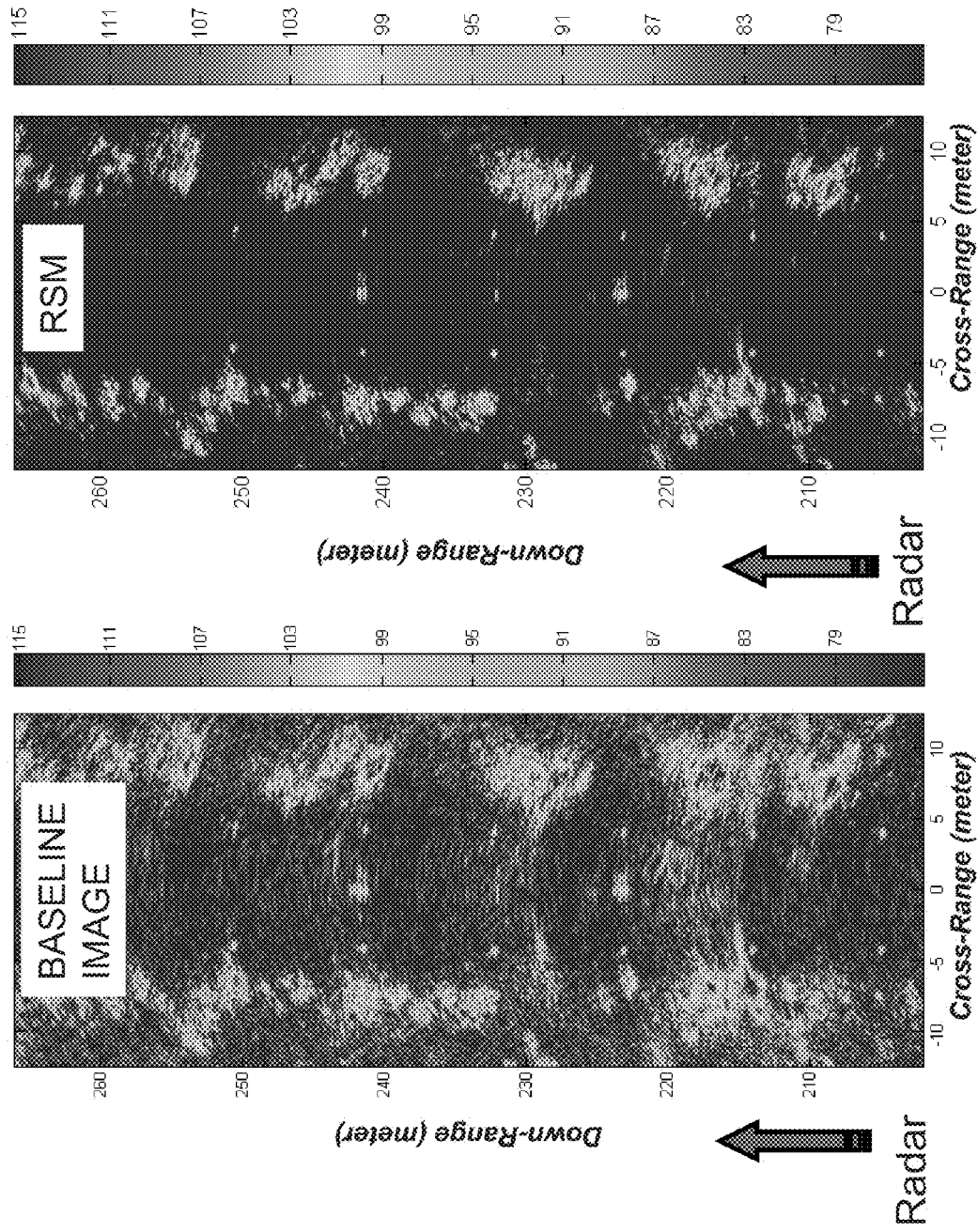
FIG. 12  SIRE FORWARD-LOOKING RADAR

METHOD AND SYSTEM FOR FORMING AN IMAGE WITH ENHANCED CONTRAST AND/OR REDUCED NOISE

STATEMENT OF GOVERNMENT INTEREST

The invention described herein may be manufactured, used, and licensed by or for the United States Government.

FIELD OF INVENTION

This invention relates broadly to signal processing and in particular to methods and systems for the enhancing and/or processing images from signals such as radar, X-ray CAT scans, MRI (magnetic resonance imaging) equipment, or other image generating machines.

REFERENCE TO PARTIAL COMPUTER PROGRAM LISTING

Appendix A contains a partial computer program listing adapted for a preferred embodiment of the present invention.

BACKGROUND OF THE INVENTION

The present invention relates to the generation of images from projection measurements. Examples of images generated from projection measurements include two-dimensional and three-dimensional SAR (synthetic aperture radar) systems. SAR is a form of radar in which the large, highly-directional rotating antenna used by conventional radar is replaced with many low-directivity small stationary antennas scattered over some area near or around the target area. The many echo waveforms received at the different antenna positions are post-processed to resolve the target. SAR can be implemented by moving one or more antennas over relatively immobile targets, by placing multiple stationary antennas over a relatively large area, or combinations thereof. A further example of images generated from projection measurements are ISAR (inverse SAR) systems, which image objects and many features on the ground from satellites, aircraft, vehicles or any other moving platform. SAR and ISAR systems are used in detecting, locating and sometimes identifying ships, ground vehicles, mines, buried pipes, roadway faults, tunnels, leaking buried pipes, etc., as well as discovering and measuring geological features, forest features, mining volumes, etc., and general mapping. For example, as shown in FIG. 1 of U.S. Pat. No. 5,805,098 to McCorkle, hereby incorporated by reference, an aircraft mounted detector array is utilized to take ground radar measurements. Other examples of systems using projection measurements are fault inspection systems using acoustic imaging, submarine sonar for imaging underwater objects, seismic imaging system for tunnel detection, oil exploration, geological surveys, etc., and medical diagnostic tools such as sonograms, echocardiograms, x-ray CAT (computer-aided tomography) equipment and MRI (magnetic resonance imaging) equipment.

Systems which produce images from projection data generally use techniques in the time domain, where a backprojection-type algorithm is used, or frequency domain, where Fourier transforms are used. Since a Fast Fourier Transform (FFT) technique, such as a technique known as the "$\omega$–k" implementation, requires data to be equally spaced, FFT-based techniques produce sub-optimal images when the data source is moving uncontrollably, such as an aircraft buffeted by winds or vehicles in rough terrain. Non-uniform spacing requires a Discrete Fourier Transform (DFT) which increases computation expense relative to a backprojector technique. Also, two-dimensional FFT's are not well suited to multiprocessor-based supercomputers because they face a corner-turn interprocessor communication bottleneck.

While there are many forms of Fourier-based algorithms for SAR processing, they fall into two broad classes known as "strip-map" mode and "spot light" mode. The most robust technique is the $\omega$–k technique, also known as seismic migration. The advantage of the $\omega$–k algorithm over the backprojection algorithm is speed. The $\omega$–k algorithm is an order $N^2 \log_2(N)$ implementation—much faster than $N^3$ for large images and data sets.

Time domain backprojection-based techniques have been used for numerous applications, including x-ray CAT scans, MRI and sonograms. Historically, medical people have preferred backprojection because its artifact levels were lower than those using fast Fourier transform (FFT) approaches. Efforts in the past to speed up the backprojection process have focused on fast index generation. The algorithm form used by the medical industry (e.g., Star Computers) for x-ray CAT scans requires approximately $2N^3$ adds to form an N by N image from N projections—$N^3$ adds for indexing operations, and $N^3$ adds for accumulating the projections into the image. Seismologists and people using SAR have also used backprojection.

Synthetic aperture radar systems have been used in applications such as area mapping, surveillance, and target detection. The radar is usually mounted on an aircraft or a vehicle configured with transmitting and receiving antennas to transmit and measure the reflected radar signals from areas of interest. Through signal processing, the reflected radar signals along the flight path are combined to form the SAR imaging for side looking or forward looking surveillance.

SAR imaging is complex for a variety of reasons. First, the data is not inputted at equally distant (or known) points. Instead, data may be inputted in a non-uniform manner from an aircraft that is buffeted by the wind or from a ground vehicle that traverses rough ground. Therefore, motion compensation must be introduced in order to produce sharp images. Second, the subject objects need not be point sources but may be dispersive—where energy is stored and "re-radiated" over time. Ground penetrating SAR adds the complication that the media propagation velocity varies which complicates seismic processing. For many SAR applications, especially for high-resolution, ultra-wide-angle (UWA), ultra-wide-bandwidth (UWB) surveillance systems, the task is particularly problematic because the data sets are large, real-time operation is essential, and the aperture geometry is not controlled. For example, small aircraft buffeted by the wind can affect SAR data due to significant off-track motion and velocity changes. As a result, the data is not sampled at equally spaced intervals.

Backprojection techniques provide many advantages; including sharper images. Although prior art backprojector implementations may generate image artifacts; they are constrained to be local to the object generating the artifacts and generally lie within the theoretical sidelobes. Side lobes are the lobes of the radiation pattern that are not the main beam or lobe. In an antenna radiation pattern or beam pattern, the power density in the side lobes is generally much less than that in the main beam. It is generally desirable to minimize the sidelobe level (SLL), commonly measured in decibels relative to the peak of the main beam. The concepts of main and side lobes apply to (but are not limited to) for example, radar and optics (two specific applications of electromagnetics) and sonar. The present invention is directed to techniques which minimize the effects of theoretical sidelobes in order to provide enhanced images.

Backprojector techniques also allow for non-uniform spacing of the projection data. The non-uniform spacing is directly accounted for in the index generation, which is important when compensating for aircraft motion.

Conventional time domain image formation, or backprojection, from SAR data, is accomplished by coherently summing the sampled radar returns for each pixel. In this context, coherent summation can be thought of as time-shifting the signal obtained at each aperture position (to align them to a particular pixel) and adding across all aperture positions to integrate the value at that pixel. This time-align-and-sum sequence is repeated for every pixel in the image.

A method and system for forming images by backprojection is explained in U.S. Pat. No. 5,805,098 to McCorkle, hereby incorporated by reference as though fully rewritten herein. Specifically, FIG. 2 of the 1998 patent illustrates antennas at positions 208 along axis 204 in an array that observe pixels 202 in the near field of the array. A relative position of each pixel (q,r) with respect to each antenna position j defines a vector 206. For each pixel (q,r), the disclosed process time-shifts the signals obtained at each aperture position j (to align, or stack, them at a particular pixel location) to correct the signals for propagation time along each vector 206 and then adds across all aperture positions to integrate to the value at the pixel. Thus, signals propagating from that location are in-phase and reinforced, while signals propagating from other locations are not in phase and integrate toward zero. The image is generated by forming such a sum for each pixel as shown in equation (1A) below.

In equation (1A) below, the pixels of the image area are indexed by (q,r) and the aperture positions are indexed by j, where j=0 . . . L−1 and L is the number of elements in the aperture. If $s_j(t)$ represents the range-compensated ($R^2$ propagation loss corrected, where R is range) voltage received at the $j^{th}$ aperture position as a function of time (t), $z_1$ is an aperture weighting to shape the sidelobes, for example, with a Hamming window, or to account for the aperture spacing, and $T_{q,r,j}$ is the time shift necessary to align the signal received at sensor position j to the pixel at position (q,r) (a function of the round-trip time from sensor phase center to pixel position), then the value of the focused pixel at image position (q,r) is given by:

$$f_{q,r}(t) = \sum_{j=0}^{L-1} z_i \cdot s_j(t + T_{q,r,j}). \quad (1a)$$

Here, t describes how the focused signal at location (q,r) varies with time, and is useful for studying late-time target ringing. This description of backprojection considers the case where t is fixed for the entire image.

Accurately obtaining the time-shifted values $s_j(t+T_{q,r,j})$ requires a time domain interpolation of the sampled received signals. Prior art techniques included the following steps:

1. Up-sample and low-pass filter the received signal to produce a finer resolution signal $s_j$.
2. Compute the floating point indexes into the sequence s.sub.j corresponding to time $t+T_{q,r,j}$.
3. Linearly interpolate between samples to obtain an approximation of s.sub.j (t+T.sub.q,r,j).

The following references give an overview of the state of the art and are hereby incorporated by reference in their entireties:

1. J. McCorkle, "Focusing Of Synthetic Aperture Ultra Wideband Data," IEEE Intl Conf on Systems Engineering, August, 1992, p. 1-5;
2. J. McCorkle and Lam Nguyen, "Focusing of Dispersive Targets Using Synthetic Aperture Radar," ARL-TR-305, August, 1994;
3. R. Stolt, "Migration by Fourier Transform," Geophysics, Vol. 43, p. 23ff.;
4. F. Rocca, C. Cafforio, and C. Prati, "Synthetic Aperture Radar: A New Application for Wave Equation Techniques," Geophysical Prospecting, Vol. 37, 1989, pp. 809-30.
5. C. Cafforio, C. Prati, and F. Rocca, "SAR Data Focusing Using Seismic Migration Techniques," IEEE Transactions on Aerospace and Electronic Systems, Vol. AES-27, No. 2, March, 1991, pp. 194-206;
6. R. Bamler, "A Comparison of Range Doppler and Wavenumber Domain SAR Focusing Algorithms," IEEE Transactions on Geoscience and Remote Sensing, Vol. 30, No. 4, Jul. 1, 1992, pp. 706-713;
7. J. McCorkle and L. Nguyen, "Ultra Wide Bandwidth Synthetic Aperture Radar Focusing of Dispersive Targets," HDL-R-ST-R-92-004, March, 1992;
8. M. Ressler et al., "The Army Research Laboratory Ultra-Wideband Testbed Radars," IEEE 1995 International Radar Conference, Alexandria, Va., May, 1995; and
9. L. Happ et al., "Low-Frequency Ultra-Wideband Synthetic Aperture Radar 1995 BoomSAR Tests," IEEE 1996 National Radar Conference, Ann Arbor, Mich., May, 1996.

An example of a forward-looking Synchronous Impulse Reconstruction (SIRE) radar that can be vehicle-mounted has been designed and built by the Army Research Lab. A more complete description of the SIRE radar can be found in M. Ressler, L. Nguyen, F. Koenig, D. Wong, and G. Smith, "The Army Research Laboratory (ARL) Synchronous Impulse Reconstruction (SIRE) Forward-Looking Radar", Proceedings of SPIE, Unmanned Systems Technology IX, April 2007, hereby incorporated by reference. The SIRE radar has two transmitters and an array of receiving antennas. The two transmitters alternatively transmit wide bandwidth impulses to illuminate the area in front of the vehicle. An array of receiving antennas measures the returned radar signals. The wide bandwidth of transmitted impulses provides the down-range resolution while the array of receiving antennas provides the cross-range resolution. It has been shown that the configuration with two transmitters located at the end of the array is the optimum configuration to achieve cross-range resolution while minimizing the number of required transmitters.

After data is acquired by the radar hardware, it is transferred to a computer for signal processing and image formation. The signal processing steps include a) self-interference extraction, b) removing radar signature distortion due to moving platform, and c) sub-band filtering. The self-interference processing step to extract the interference components from the returned radar signals and the technique to remove the phase and shape distortion in radar signals due to the motion of the radar platform are described in the publication by Lam Nguyen, entitled "Signal Processing Technique to Remove Signature Distortion in ARL Synchronous Impulse Reconstruction (SIRE) Ultra-Wideband (UWB) Radar," Army Research Laboratory Technical Report, ARL-TR-4404, March 2008, hereby incorporated by reference.

After all the signal processing steps are applied to the returned radar signals, the processed radar range profiles may be used for forming a SAR image. In a preferred embodiment, the back-projection algorithm is utilized for the image formation step. See, John McCorkle and Lam Nguyen, "Focusing of Dispersive Targets Using Synthetic Aperture Radar," Army Research Laboratory Report, ARL-TR-305, August 1994.

FIG. 1A illustrates an example utilizing the basic concept of the backprojection imaging algorithm. The radar is mounted on a moving platform. It transmits radar signals to illuminate the area of interest and receives return signals from the area. Using the motion of the platform, the radar collects K data records along its path (or aperture). In general the aperture could be a line, a curve, a circle, or any arbitrary shape. The receiving element k from the aperture is located at the coordinate $(x_R(k), y_R(k), z_R(k))$. For bistatic radar (the transmitting antenna is separate from the receiving antenna) the transmitting element k from the aperture is located at the coordinate $(x_T(k), y_T(k), z_T(k))$. For monostatic radar (the transmitting antenna is the same as or co-located with the receiving antenna) the transmitting coordinates $(x_T(k), y_T(k), z_T(k))$ would be the same as the receiving coordinates $(x_R(k), y_R(k), z_R(k))$. Since the monostatic radar case is a special case of the bistatic radar configuration, the algorithm described here is applicable for both configurations. The returned radar signal at this receiving element k is $s_k(t)$. In order to form an image from the area of interest, we form an imaging grid that consists of N image pixels. Each pixel $P_i$ from the imaging grid is located at coordinate $(x_P(i), y_P(i), z_P(i))$. The imaging grid is usually defined as a 2-D rectangular shape. In general, however, the image grid could be arbitrary. For example, a 3-D imaging grid would be formed for ground penetration radar to detect targets and structures buried underground. Another example is 3-D image of inside human body. Each measured range profile $s_k(t)$ is corrected for the $R^2$ propagation loss, i.e. $s'_k(t)=R^2(t) s_k(t)$, where $$R(t) = \frac{ct}{2}$$

and $c=2.997e^s$m/sec. The backprojection value at pixel P(i) is $$P(i) = \sum_{k=1}^{K} w_k s'_k(f(i,k)), \ 1 \le i \le N \quad (1)$$

where $w_k$ is the weight factor and f(i,k) is the delay index to $s'_k(t)$ necessary to coherently integrate the value for pixel P(i) from the measured data at receiving element k.

The index is computed using the round-trip distance between the transmitting element, the image (pixel), and the receiving element. The transmitting element is located at the coordinate $(x_T(k), y_T(k), z_T(k))$. The distance between the transmitting element and the image pixel P(i) is:

$$d_1(i,k) = \sqrt{[(x_T(k)-x_P(i))]^2+[(y_T(k)-y_P(i))]^2+[(z_T(k)-z_P(i))]^2} \quad (2)$$

The distance between the receiving element and the image pixel P(i) is $$d_2(i,k) = \sqrt{[(x_R(k)-x_P(i))]^2+[(y_R(k)-y_P(i))]^2+[(z_R(k)-z_P(i))]^2} \quad (3)$$

The total distance is $$d(i,k)=d_1(i,k)+d_2(i,k) \quad (4)$$

The delay index is $$f(i,k) = \frac{d(i,k)}{c} \quad (5)$$

FIG. 1B illustrates a typical imaging geometry for an ultra wide band forward looking (e.g., SIRE) radar. In this case, the radar is configured in forward-looking mode instead of side-looking mode as illustrated in FIG. 1A. In this forward-looking mode, the radar travels and radiates energy in the same direction. The general backprojection algorithm described from [0022] to [0026] applies to the embodiment of FIG. 1B. As seen in FIG. 1B, the radar travels in parallel to the x-axis. The backprojection image formation is combined with the mosaic technique. The large area image is divided into sub-images. The size of each sub-image may be, for example, 25 m in cross-range and only 2 m in down-range (x-axis direction). The radar starts at coordinate A, which is 20 m from sub-image 1, and illuminates the entire image area to the right.

The following is a description of the platform 10 in FIG. 1B as it passes four sequential positions $10^A$, $10^B$ $10^C$ & $10^D$ located at x-coordinates A, B, C & D, respectively. The formation of the first sub-image begins when platform 10 is at the coordinate A, 20 meters from the block labeled "$1^{st}$ sub-image." As platform 10 travels in the x direction (as shown in FIG. 1B), signals emitted from platform 10 illuminates an entire image area to the right of platform 10, and the reflected signals are received by an array of 16 physical receiving antennas 11 positioned on the front of the platform 10. Formation of the first sub-image ends when platform 10 reaches coordinate C, at approximately 8 m from the block labeled "$1^{st}$ sub-image." Accordingly, the radar signal data for the first (full-resolution) sub-image is received as radar platform 10 travels a distance of 12 meters (20 m−8 m=12 m) from coordinates A to C, for formation of a two dimensional (2D) aperture.

The distance traveled during the formation of the two-dimensional (2-D) aperture is represented by an arrow in FIG. 1B labeled "Aperture 1." When the platform 10 reaches coordinate B, a distance of 2 meters from coordinate A in FIG. 1B, the formation of the "$2^{nd}$ sub-image" begins, and as the platform 10 travels to coordinate D, it uses the received data to form a second 2-D aperture. The distance traveled by platform 10 is represented by an arrow in FIG. 1B labeled "Aperture 2." Note that the two apertures are overlapped by 10 m and the second aperture is "advanced" by 2 m with respect to the first aperture. Sub-images 1 and 2 are formed from the 2-D apertures using the same length of travel (12 meters) of the radar. This process is applied to ensure that image pixels have almost the same (within a specified tolerance) resolution across the entire large area. The sub-images are formed from the radar range profiles using the back-projection algorithm.

FIG. 2 shows the back-projection algorithm applied to form a sub-image. The procedure mathematically described with respect to FIG. 1A in the above paragraphs may also be applied to this imaging scenario. In this case, the radar aperture is a rectangular array that is formed by an array of 16 receiving elements (that spans 2 meters) and the forward motion of the platform (12 meter for forming each sub-image). The imaging grid in this case is defined as a rectangular array of 25×2 meter.

FIG. 3 shows a SAR image formed using the above algorithm using simulated data of two targets (points). The image is displayed using 40 dB of dynamic range. However, "energy" from the two point targets is spread throughout the image and creates severe sidelobes. There are two sources that generate the imaging artifacts in this case: a) aperture aliasing (small aperture compared to the large image cross-range swath), and b) the errors from the position measurements system. In reality, there are many other sources that contribute to the noise floor of the resulting image. This created a challenging problem for the detection of targets of smaller amplitudes since they might be obscured or even embedded in the noise floor.

The term "noise" as used herein relates to image noise. There are many sources that cause noise in the resulting image. Noise can be divided into two categories: additive noise and multiplicative noise. System noise, thermal noise, quantization noise, self-interference noise, radio frequency interference (RFI) noise are some examples of the additive noise. Multiplicative noise is much more difficult to deal with since it is data dependent. Some sources that cause multiplicative noise include: timing jitter in data sampling, small aperture size compared to image area, the under-sampling of aperture samples, the non-uniform spacing between aperture samples, errors in position measurement system, etc. Multiplicative noise results in undesired sidelobes that create high noise floor in the image and thus limit the ability to detect targets with smaller amplitudes.

Radar and other imaging systems currently suffer various noise sources that prevent the generation of very high contrast images. As a result, difficult targets (with low amplitudes) are often obscured or even embedded in the noise level of the image background. Moreover, sidelobes from large targets are mistaken as targets of interest. Recently the ARL has designed and built a new ultra-wideband imaging system for the detection of difficult targets. Currently, there exists a need for an improved signal processing technique which reduces unwanted noise and enhances image reproduction.

BRIEF SUMMARY OF THE INVENTION

The invention enables the generation of very high contrast images with greatly enhanced performance. The resulting benefits are: a) high contrast image with the significant reduction in the noise level, b) detection of targets with very small amplitudes, and c) the reduction in the false alarm rate. Such benefits result in a substantially improved practical system for detecting difficult targets, which is an obstacle that most radar systems are facing today. The present invention comprises a non-linear imaging algorithm that significantly improves the background noise level of the resulting image (FIG. 4) without negatively affecting the focus quality (sharpness) as well as the target amplitudes. A preferred embodiment of this technique has been denominated as Recursive Sidelobe Minimization (RSM), which has been successfully implemented and tested.

Briefly, a preferred embodiment of the invention (FIG. 5) involves the collection of radar data from a number of positions. For each position, radar data and the positional data are recorded. As used herein, a "data point" represents the received signal radar data from each position obtained during an instant or interval in time combined with positional information corresponding to the transmitting and/or receiving position or location. The data points may be collected by either an array of elements or a single moving element which receives data at points in time, or the combination of both; e.g., a physical array of elements with the elements moving over increments of time. The data collection may be sporadic or at specific intervals of time. In a preferred embodiment of the invention, as exemplified in FIG. 6, data points are obtained using an array of receiving elements which receive data incrementally. The data points are arranged to form an aperture. As used herein, the term "aperture" means the information or data components used to form an image; which may be for example, an array of data points developed from a scanned area, target or scene which can be used to form an image. In the apertures depicted in FIG. 6, each column represents an interval during which the 1-k elements receive data; each data point representing the image data from the signal received combined with the coordinates of the receiving element. In accordance with the principles of the present invention, after the data points are established in an aperture (or array), as diagrammatically shown in FIG. 6, a substantial portion of data points are removed from the original aperture (array of data points) to form a "subarray." Conversely, the "subarray" may be formed by the selection of data points within the original aperture. Depending upon the quality of the result desired and the nature of the image being undertaken, the substantial portion of the data points removed or selected may range from as little as one percent to ninety percent. However, one percent removal will result in negligible difference and ninety percent removal will result in drastic reduction of image quality. In general, it is preferred that the percentage of data points subject to removal be within a range of approximately twenty to fifty percent. Using the remaining data points in the aperture, a first preliminary image is formed. During a second interval, the process of removing a different set of twenty to fifty percent of the data points within the original aperture is repeated and a second aperture is formed. In a preferred embodiment, the data points subject to removal are randomly chosen. However, random selection is not necessary to practice the principles of the present invention and some other arbitrary or contrived selection process may be used.

A second preliminary image is formed from the second aperture following the removal of a different set of data points. The first and second preliminary images are then compared. Using the principles of the present invention, the magnitude of the signal at each bit-mapped location of the preliminary images is compared. Any pixel having a greater or equal value is discarded, and only the lesser value is used for each bit-mapped location in the merged image. For each subsequent iteration, approximately twenty to fifty percent of the data points are removed to form an aperture and the preliminary image developed therefrom is compared with the previously merged image. The magnitude of the signal at each pixel or bit mapped location is compared and only the lesser value is retained for each bitmapped location in the combined image. This process is repeated iteratively over a series of iterations, which may be for example ten to several hundred iterations. The result is the substantial elimination of noise from the resulting merged image.

Although the technique is implemented and demonstrated for the ultra wide band forward-looking imaging radar (e.g., ARL SIRE), the technique is suitable for used for other image radar as well. We also applied the technique for the Boom-SAR radar, which is a different radar with different configuration (side-looking). Moreover, this imaging technique is not limited to the formation of radar images as it can be applied to other applications such as CAT scans, magnetic resonance, seismic, sonar, and acoustic imaging.

Use of the present invention results in an improvement of image contrast by reducing system noise by a significant level, significantly improving system performance; and can be adapted for use with existing radar systems.

An advantage of the present invention over presently known devices, systems or processes is the generation of high contrast images produced by significantly reducing the noise level in the system such that very difficult targets or objects (with low amplitudes) in the image can be detected, which otherwise would be embedded in the system noise.

Generally speaking, in any imaging system, the sidelobes from large objects or noisy spots generated by the system may be mistaken as targets of interest. In accordance with the principles of the present invention, the large sidelobes are substantially virtually eliminated, thus reducing the false alarm objects that would be considered as targets of interest.

Possible uses other than radar imaging include magnetic resonance imaging, CAT scan, sonar imaging, and acoustic imaging.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

FIG. 1A is a schematic diagram of a generalized conventional technique for image projection.

FIG. 10 illustrates compressive images and intermediate resulting images in three iterations.

FIG. 11 is an illustration of resulting images at various iterations.

FIG. 11A is an illustration of the effect of removing a different percentage of data points from the apertures from which the images were derived.

FIG. 12 is an illustration of recursive sidelobe minimization technique using data from ARL SIRE forward looking radar.

DETAILED DESCRIPTION OF THE INVENTION

Figure 1B:
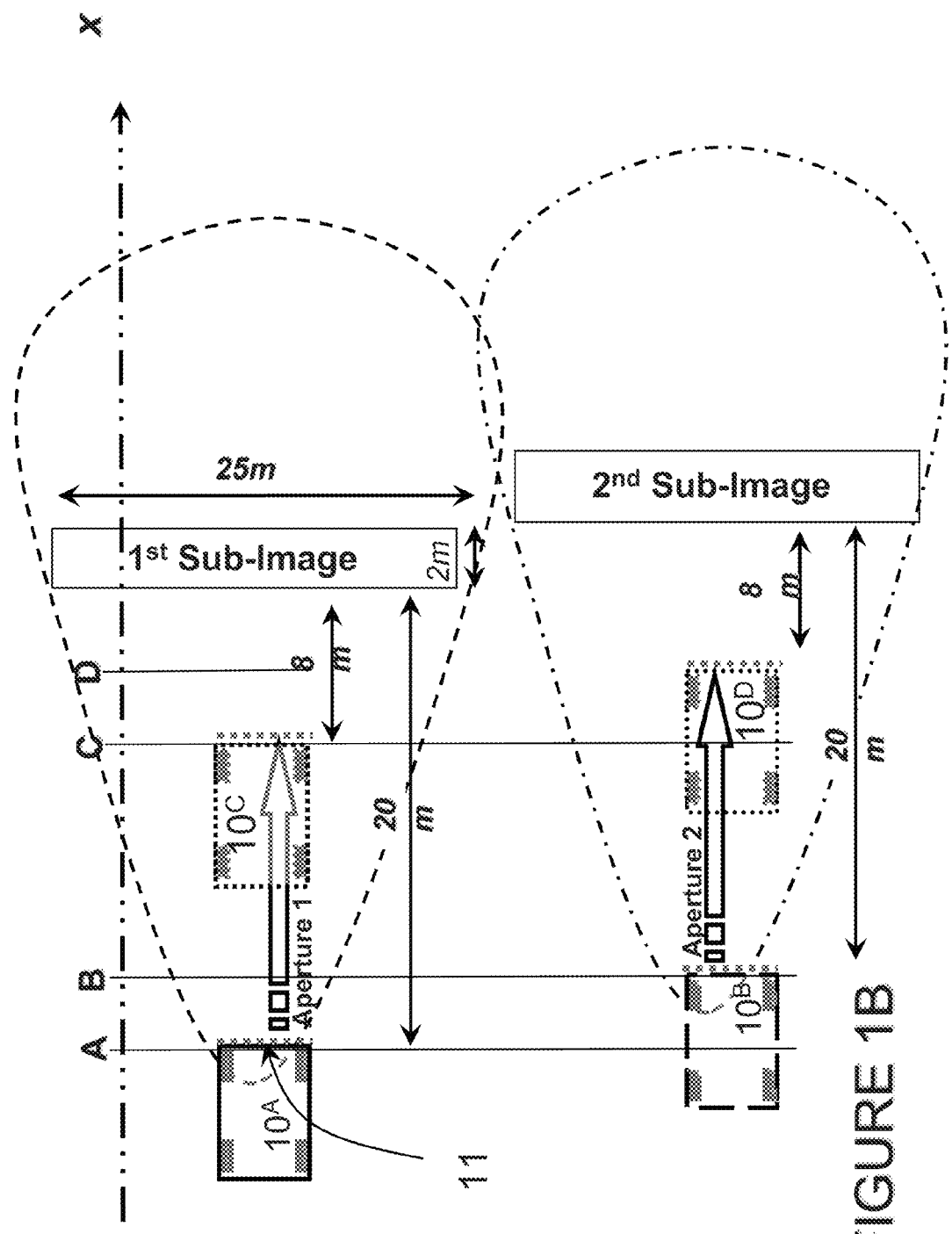
FIG. 1B is a schematic diagram of ultra wide band (UWB) forward looking radar imaging geometry and mosaic imaging.
Figure 2:
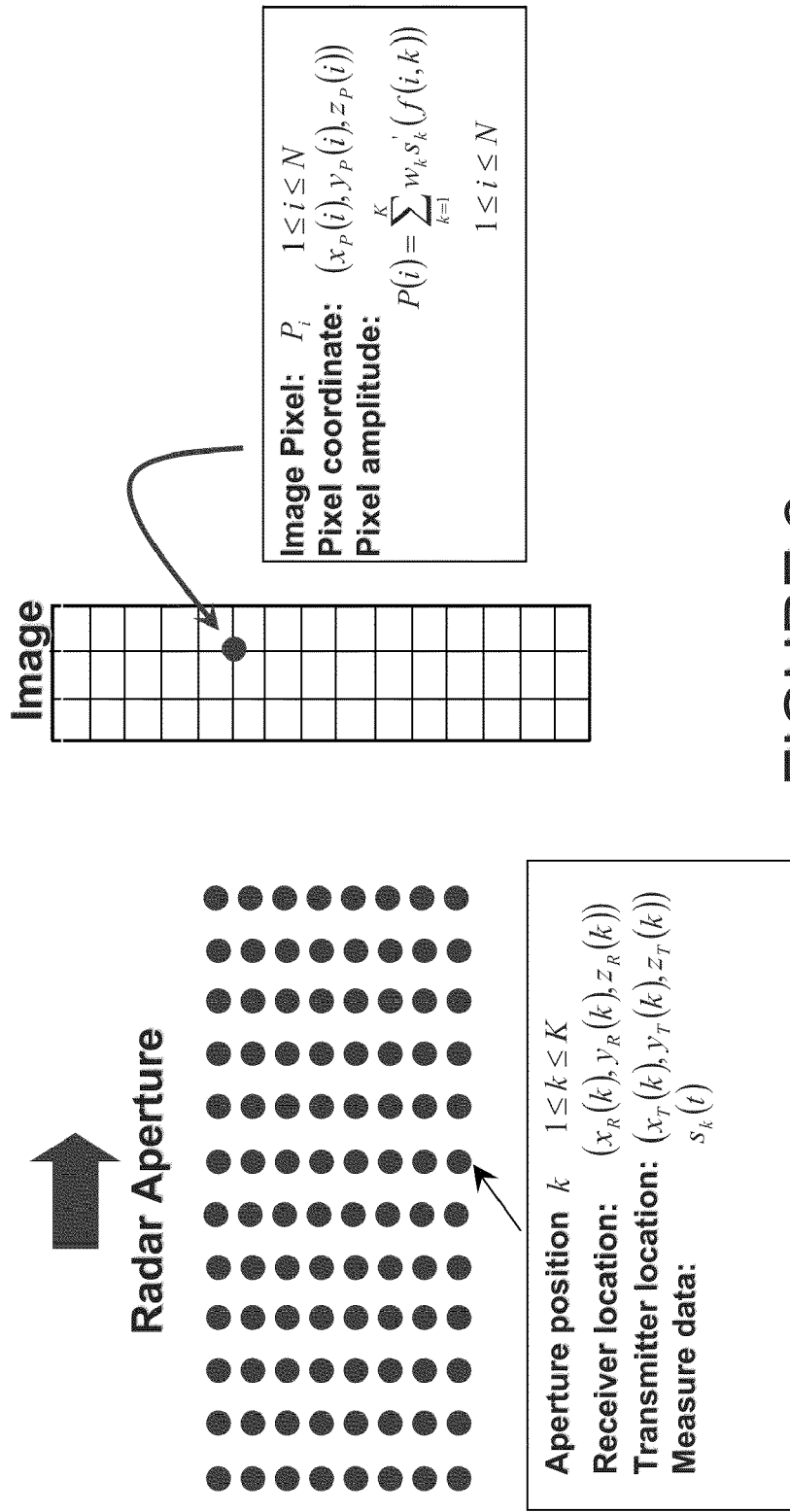
FIG. 2 illustrates the back-projection image formation being applied to each sub-image.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

Figure 3:
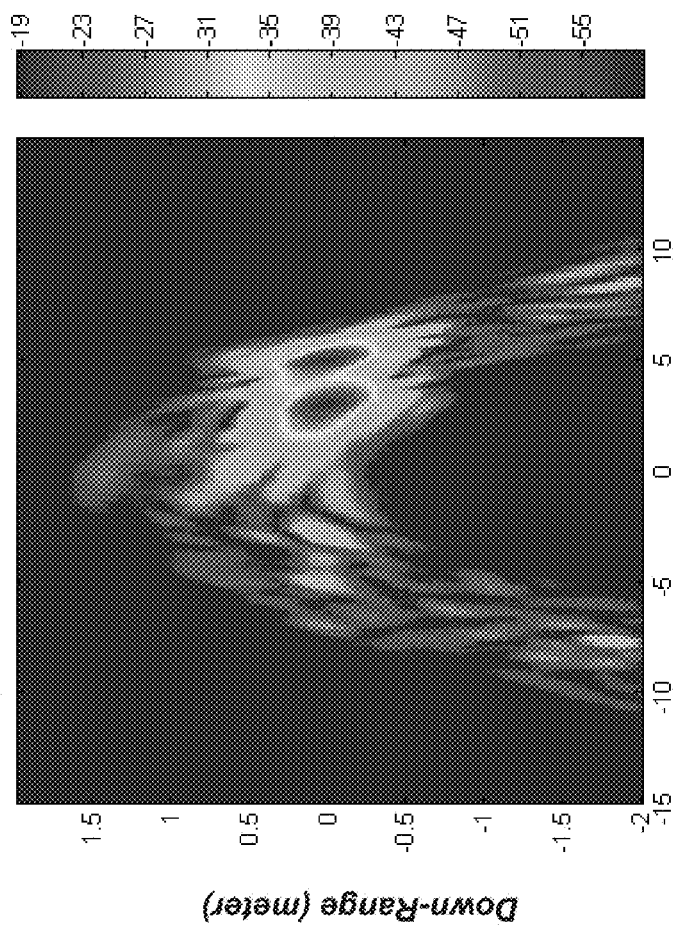
FIG. 3 illustrates a SAR image of two simulated point targets formed using a baseline algorithm for comparison purposes.
Figure 4:
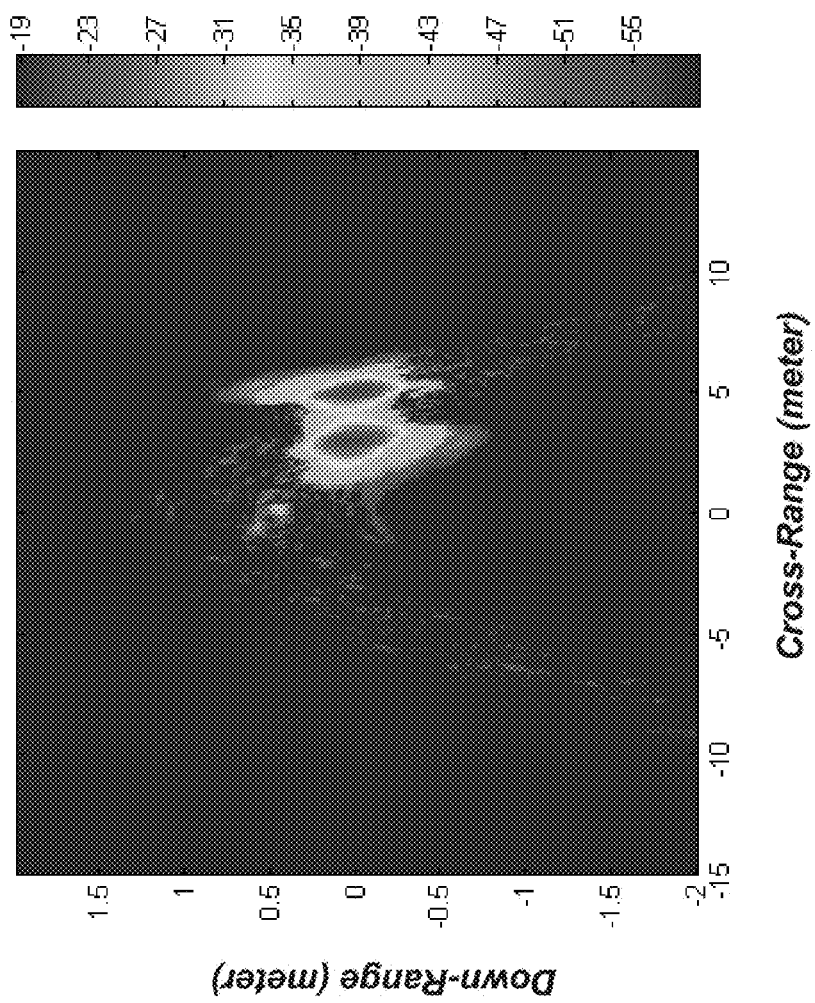
FIG. 4 illustrates the same SAR image of two simulated point targets formed using a preferred embodiment technique of the present invention.

FIG. 4 shows the SAR image for the same area as FIG. 3, except that this image is processed using a preferred embodiment of algorithm constructed in accordance with the principles of the present invention FIG. 4 is displayed using the same dynamic range (40 dB) as FIG. 3 for comparison purposes. It is obvious from viewing the images presented in FIGS. 3 and 4 that the noise floor in the resulting images is significantly reduced. The sidelobe level in the resulting image shown in FIG. 4 is reduced by 13.5 dB from that shown in FIG. 3.

Figure 5:
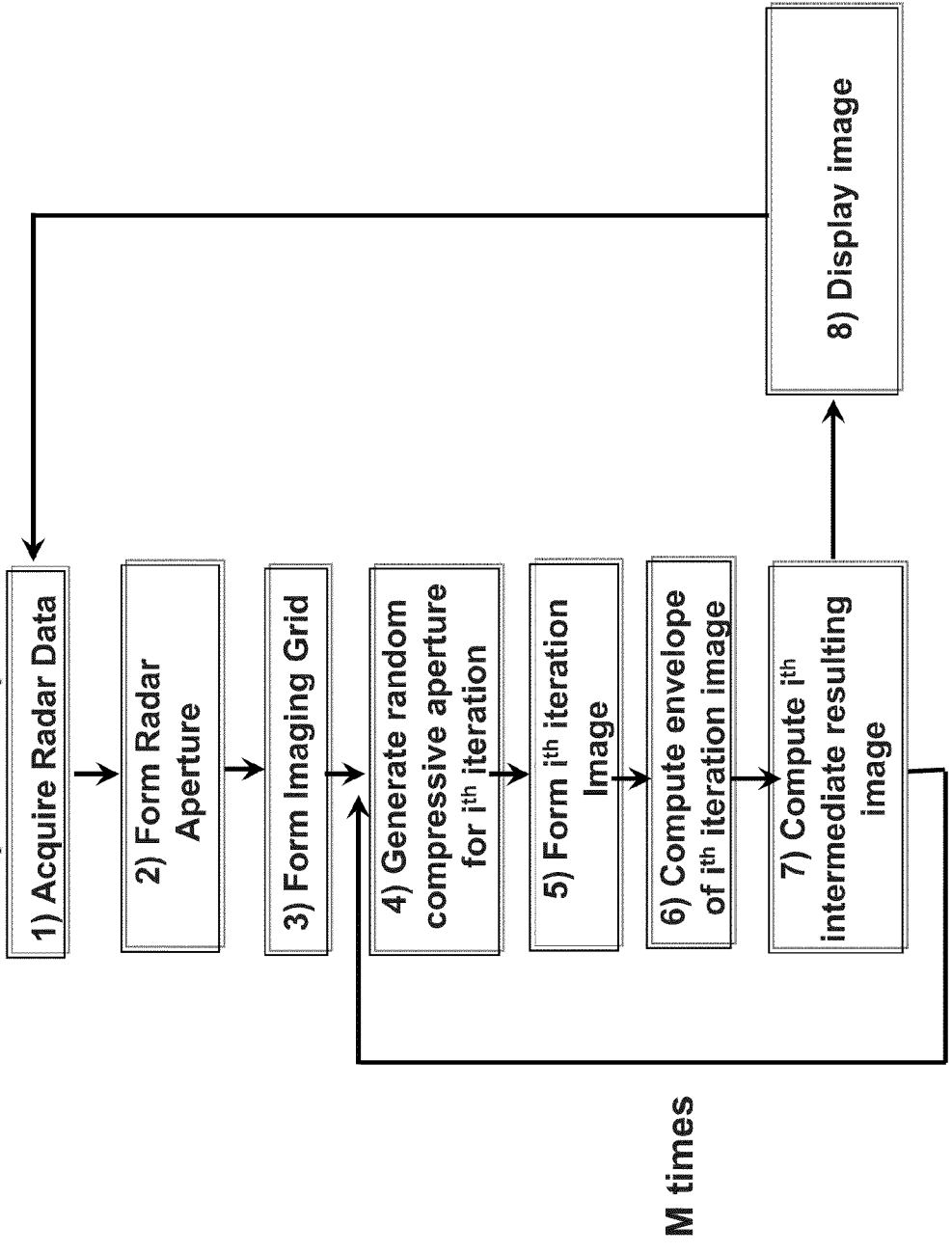
FIG. 5 is an flow chart representation of a preferred embodiment of the invention utilizing a Recursive Sidelobe Minimization (RSM) Technique using multiple compressive apertures

FIG. 5 shows a preferred embodiment flow chart of the Recursive Sidelobe Minimization (RSM) technique using a compressive aperture which significantly reduces the multiplicative noise in the process of forming a SAR image. As used herein, the term "compressive aperture" refers to an aperture after randomly or arbitrarily selected data points have been removed. FIG. 5 illustrates the following steps:

Step 1—Radar data and its position information is acquired.

Step 2—The radar aperture is formed in preparation for image formation. The aperture consists of K elements. Each element in the radar aperture includes the radar receiving position information $(x_R(k), y_R(k), z_R(k))$, the radar transmitting information $(x_T(k), y_T(k), z_T(k))$, and the data record $s_k(t)$ that the radar measures at this location. For side-looking radar, the aperture is usually a linear path with data measured along the path. For the forward-looking radar mentioned above, a 2D radar aperture is generated; formed by the physical antenna array and the forward motion of the radar. Although the terminology "2D" or two dimensional is used to reflect the aperture configuration, the data within the 2D aperture may contain three dimensional information concerning the target area in that the signal data may include the distance at which the target is located relative to the receiving element. In general, the radar aperture may take any of a variety of shapes and those shown are merely examples.

Step 3—The imaging grid is formed. In a preferred embodiment a rectangular imaging grid is generated although the imaging grid could be arbitrary defined. Each pixel $P_i$ in the imaging grid is located at coordinate $(x_p(i), y_p(i), z_p(i))$.

Step 4—A random compressive aperture is generated using the radar aperture with K elements from step 2. The compressive aperture is formed by selecting only L elements from the original aperture for the imaging process. The value for L is $$L = p \cdot K. \text{ Where } 0 \leq p \leq 1 \quad (6)$$

Accordingly, only a subset of the aperture positions are used for image formation. The remaining K-L aperture positions are simply discarded for this realization. The typical number that we use for our configuration is p=0.8 (i.e., 80% of the aperture is employed and 20% of the aperture is discarded at each iteration). The value of p that can achieve best result should be examined and optimized for each configuration of geometry and radar data set. In a preferred embodiment, the selection of L aperture positions is completely random for each realization. If $A_l$ represents a vector that contains the indices of aperture positions to be included in the image formation process for $l^{th}$ realization, then:

$$A_l = \langle a_{l1}, a_{l2}, \ldots, a_{lL} \rangle \quad (7)$$

where $a_{im}$ is a random number, $1 \leq a_{im} \leq K$ and $a_{im} \neq a_{in}$ for m≠n. $\quad (8)$ The preferred embodiment may use a random number generator that produces random numbers with certain distribution. Those of ordinary skill in the art would readily appreciate that there are many types of distributions. The two distributions that are widely employed in practice are uniform (in which all values from a finite set of possible values are equally probable) and Gaussian (in which all values from a finite set of possible values follow the Gaussian distribution that has the shape of a bell curve). Although any random number distribution could be used to realize (7) and (8), a uniform distribution random number generator may be employed in this preferred embodiment. There are many different implementations for generating a uniformly distributed random numbers for use in conjunction with the present invention; including those random number generator routines that are usually defined and included in general purpose computer programming languages. For example, in C programming language the two routines srand( ) and rand( ) are used to generate a random number. First, the srand( ) routine is called to initialize the random number generator. Next, the rand( ) routine is called to generate a random number between 0 and a predefined value RAND_MAX. The following code fragment (C language) demonstrates how to generate 100 uniformly distributed numbers that have values from 0 to M=1000.

```
seed=9000; /* choose a seed value */
srand(seed); /* initialize random number generator */
M=1000; /* initialize value of M */
For (i=1; i<100; i++)
{
/* random1 is a floating-point number from 0 to 1 (not
    including 1)*/ random1=((double)rand( )/((double)
    (RAND_MAX)+(double)(1));
/* random2 is a floating-point number from 0 to M (not
    including M)*/ random2=(double)M*random_1;
/* random3 is an integer number from 1 to M (including
    M)*/ random3=(int)random2+1;
}
```

To generate the vector of random number $A_l$ as described in (7) and (8), one can use the random number generator as shown in the above code fragment example. Each time a random number is generated, it is compared to the previous ones to ensure that all elements in $A_l$ are unique as specified in (8). Otherwise, another random number is generated to satisfy (8).

It can be readily appreciated by those of ordinary skill in the art that the term "random numbers" as used herein includes numbers generated selectively or arbitrarily. As shown in the foregoing, the selection process may be one of those commonly associated with computer programming, but other number selection processes or arbitrary number selection processes may be utilized to achieve the same or similar results without departing from the principles of the present invention.

Figure 6:
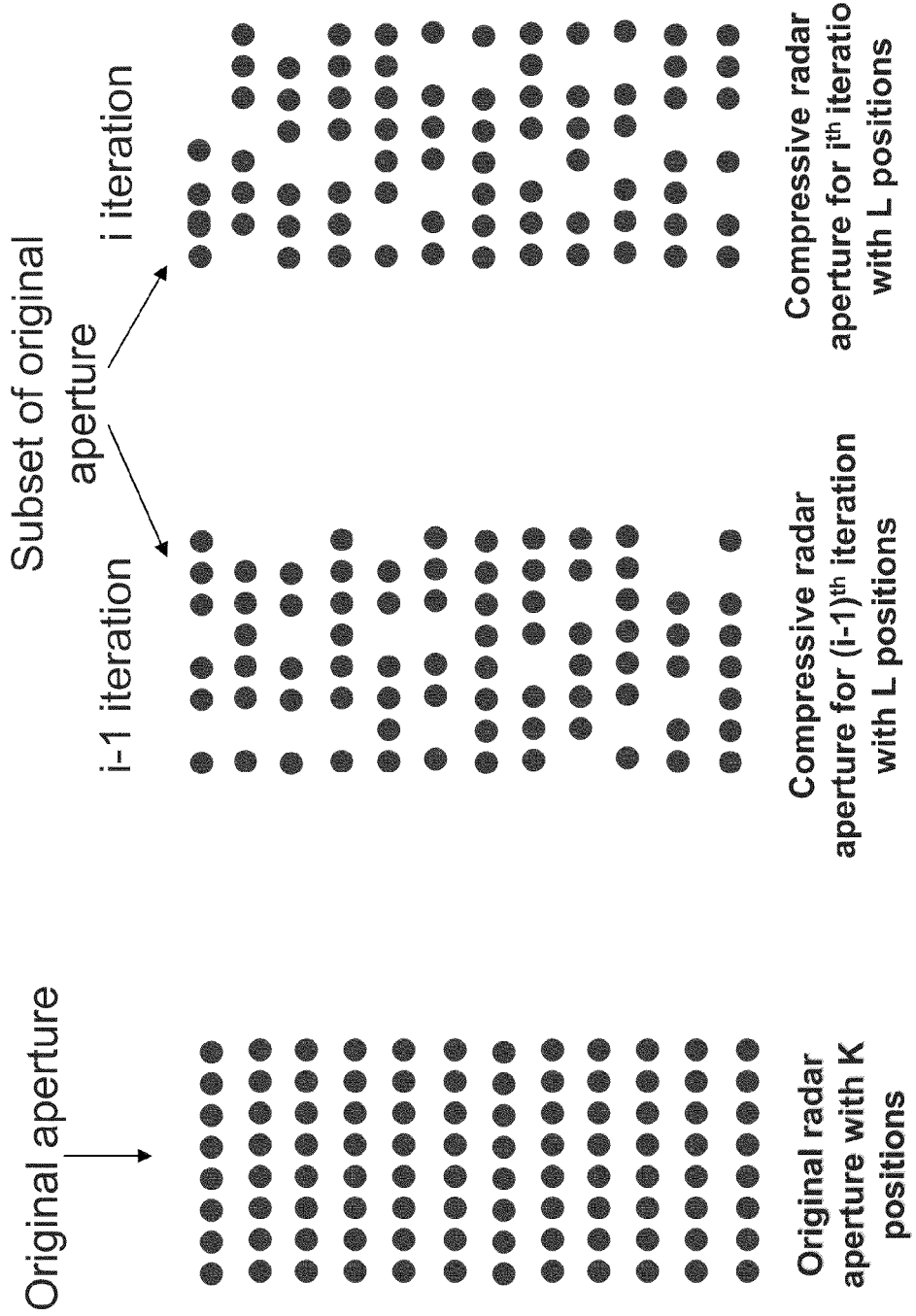
FIG. 6 is an illustration of the generation of a subset of radar aperture for each iteration.

FIG. 6 illustrates the original radar aperture and two compressive apertures generated at two different iterations. Each compressive aperture is a subset of the original aperture with gaps (deleted data points) introduced. Since the locations of the gaps in a preferred embodiment are randomly generated, the compressive aperture from $(l-1)^{th}$ iteration is different than the compressive aperture from $(l)^{th}$ iteration. In this preferred embodiment, the randomness of the gap locations is an important feature that enables performance improvement.

Generally speaking, it is not intuitive as to why only a subset of the original radar aperture is used instead of the full aperture for forming image, since gaps introduced in the subset of an aperture would seem to result in inferior performance. In prior art conventional techniques, one always prefers the full data set and avoids the gapped data set. However, the benefit of this "subset" approach will be examined later in conjunction with step 7 below.

Step 5—The image is formed using the compressive aperture generated from step 4. The compressive aperture derived from $A_l$ with L elements is then used to form the $l^{th}$ realization of the sub-image using the backprojection method as described above.

This results in the $l^{th}$ realization of the sub-image with I pixels in the down-range direction and J pixels in the cross-range direction, where N=I·J $$I_l = \langle P_l(i) \rangle, 1 \leq i \leq N, \quad (9)$$

where $P_l(i)$ is computed using equation (1) with modification, reproduced below:

$$P(i) = \sum_{k \in A_l} w_k s'_k(f(i,k)) \quad (1b)$$

Note that in the summation, the values of index k are selected from the random vector $A_l$ defined in (7).

Step 6—The envelope of the image generated in step 5 is computed. The image generated in step 5 can also be written as:

$$I_l = \langle P_{lj}(i) \rangle, 1 \leq i \leq I, 1 \leq j \leq J \quad (10)$$

where $P_{lj}$ is the $j^{th}$ down-range profile from the $l^{th}$ realization sub-image. The corresponding quadrature component of this image down-range profile is computed by applying the Hilbert transform filter to the in-phase component $$PH_{lj} = \text{Hilbert}(PH_{lj}) \quad (11)$$

The Hilbert transform filter has magnitude 1 at all frequencies and introduces a phase shift of $-\pi/2$ for positive frequencies and $+\pi/2$ for negative frequencies. Thus, the Hilbert transform filter is used to shift the real signal (each image down-range profile) by $\pi/2$ to generate its quadrature component in order to compute its envelope.

In accordance with the principles of the present invention, in one preferred embodiment using the Hilbert transform filter, the envelope of the $j^{th}$ down-range profile from the $l^{th}$ realization of the image may be computed as:

$$PE_{lj} = \sqrt{(P_{lj})^2 + (PH_{lj})^2}. \text{ (where the subscript is } lj) \quad (12)$$

The envelope of this image is simply $$I_l = \langle PE_{lj}(i) \rangle, 1 \leq i \leq I, 1 \leq j \leq J. \quad (13)$$

Figure 7:
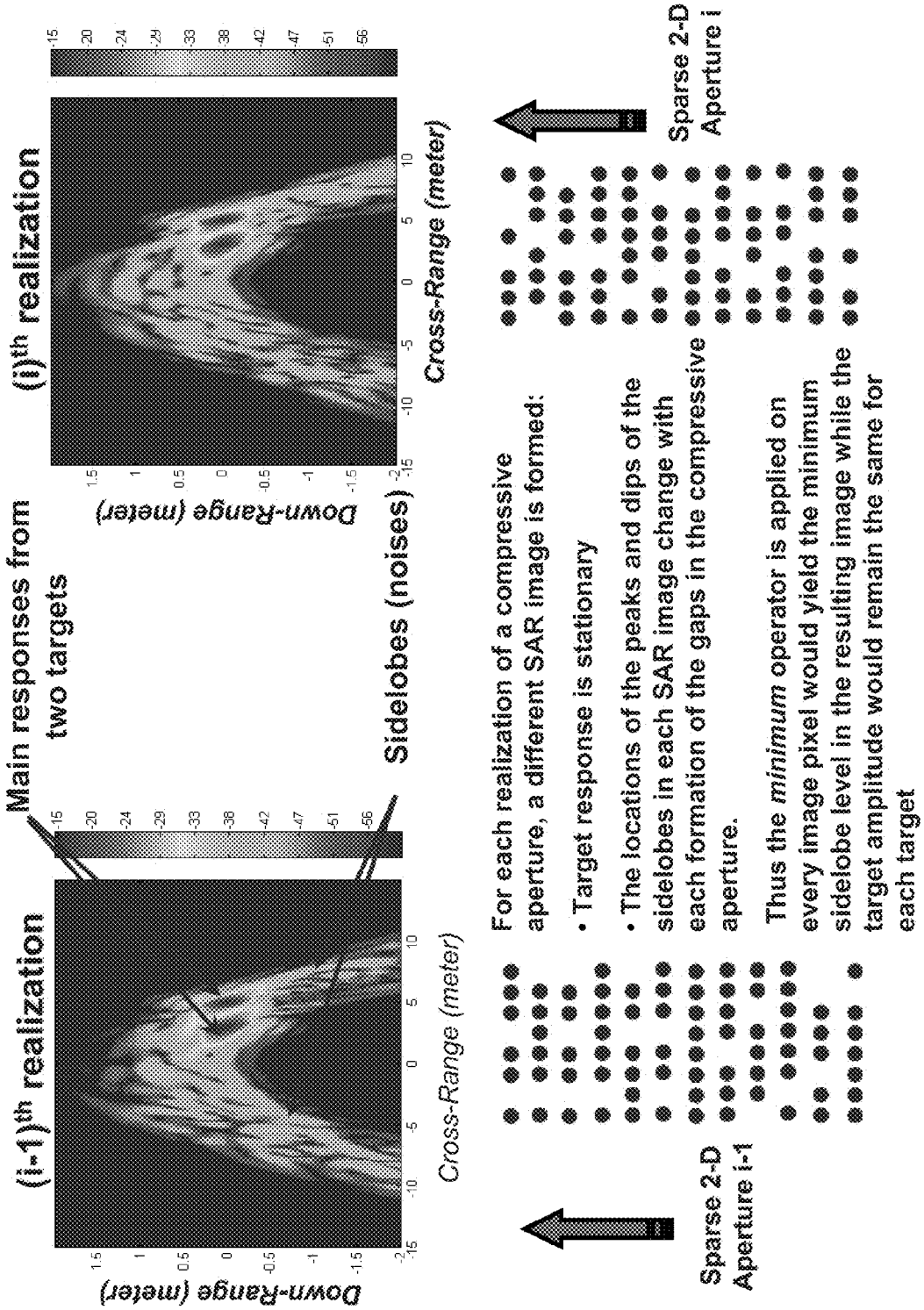
FIG. 7 is an illustration of the generation of subsets from an original radar aperture for each iteration (i−1 and i) and the realization therefrom.

FIG. 7 shows an example of an image formed from the $(l-1)^{th}$ iteration (left) and another image is form at $(l)^{th}$ iteration (right). Each image shows the main responses from the two point targets, which may not be well-focused. The energy from the two main lobes spread throughout the image. In this simulation, there are two main factors that result in severe sidelobes. First, the width of the radar aperture is small compared to the image area. Second, radar position measurement system was limited accuracy, thereby introducing errors in the radar position data. In practice, there may be many factors that contribute to the sidelobe level (and thus the noise floor) in the resulting image.

Step 7—An intermediate resulting image is computed. The minimum operator is applied to two images: 1) the intermediate result from previous iteration $(l-1)^{th}$ and 2) the image formed from this iteration. For each image pixel, the values of the two images are compared and the minimum value is selected $$Im_l = \min \langle I_l, Im_{l-1} \rangle, 2 \leq l \leq M \quad (14)$$

where $Im_l$ is the intermediate resulting image at $(i)^{th}$ iteration. Note that equation (14) is defined for $2 \leq l \leq M$. For the first iteration $(l=1)$, $Im_0$ is initialized with a very large values, so that the intermediate resulting image $Im_1 = \min \langle I_1, Im_0 \rangle = I_1$.

Figure 8:
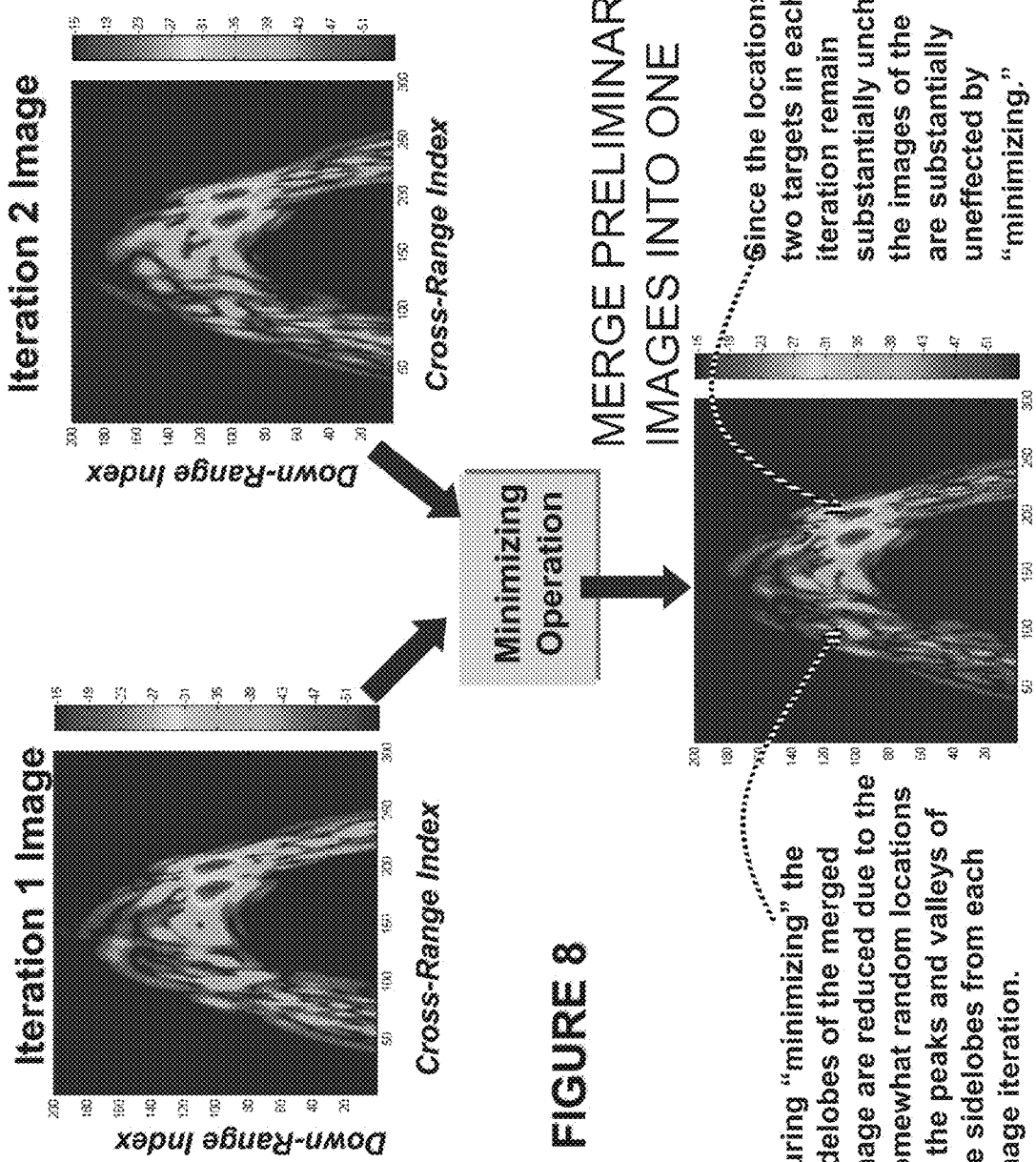
FIG. 8 is an illustration of the combination of two images (or merging) using a minimizing operation to provide an improved result.

FIG. 8 illustrates an example as to how this technique reduces the noise (sidelobes) in an image. FIG. 8 shows two images formed using two different compressive apertures. The sidelobes of the two images are different in amplitude. More importantly, the locations of the peaks and dips of the sidelobes in the two images are also different. The differences in the sidelobes of the two images are due to the different gap patterns from the two corresponding compressive apertures. On the other hand, the amplitudes of the target responses from the two images are the same, and the locations of these responses are somewhat stationary. Therefore, when a minimum operation is applied on the two images, the target responses remain unchanged in the resulting image, but the sidelobes are generally lower than either input image. As seen from the image at the bottom of FIG. 8, the sidelobe level of the resulting image is improved (lower) compared to the two input images.

Figure 9:
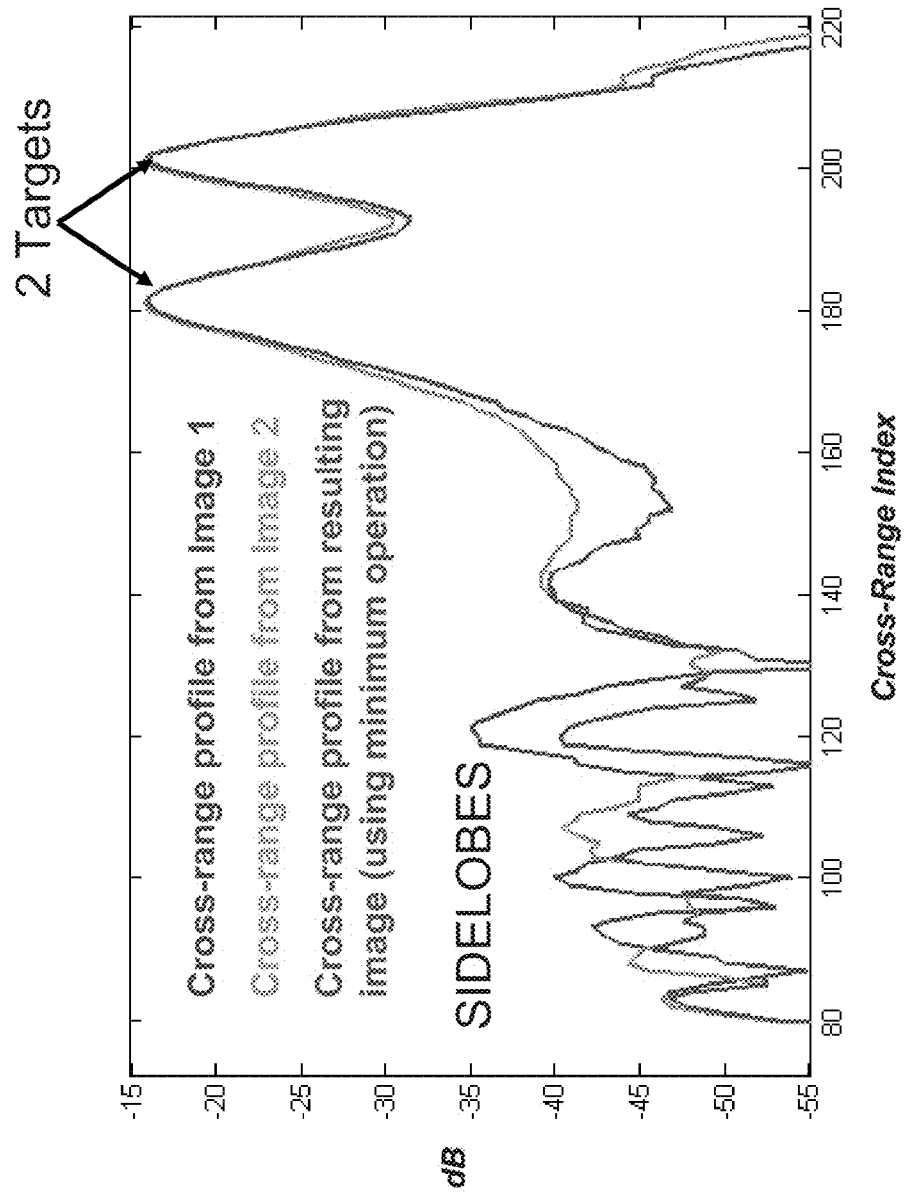
FIG. 9 is a graphical illustration showing a comparison of cross-range profiles showing the sidelobes and main lobe signals versus cross range indicies.

Another performance comparison is shown in FIG. 9, wherein the cross-range profile (horizontal cut) through each image (two input images and one resulting image) is displayed to compare the sidelobe level and the target response from each image. Again, it can be appreciated that the target responses remain substantially the same while the sidelobe level of the resulting image is better (lower) than either input image. By repeating this process for many compressive apertures, the sidelobe level in the resulting image continues to improve (lower) while the target responses remain substantially unchanged.

After step 7, the algorithm returns to step 4 to continue with the next iteration until the $M^{th}$ iteration is finished. The intermediate resulting image is also sent to the display routine for visualizing the image. FIG. 10 illustrates the compressive image and the intermediate resulting image generated in the first three iterations. FIG. 11 shows the results at various iterations. In the resulting image at iteration 50, the sidelobes are significantly suppressed while the responses of the two targets remained unchanged.

FIG. 9 is a graphical illustration showing a comparison of cross-range profiles which represent two preliminary images that are compared using the "minimizing" technique and merged into a resulting image. As graphically presented in FIG. 9, the amplitudes of the resulting two targets remain the same after the "minimizing" operation and the locations of the targets do not change. However, when the sidelobes of the resulting image are compared at various points and the lower value is selected, for each iteration the resulting image contains a profile less than the preceding iteration. That is, the sidelobes of images 1 and 2 are diminished during the "minimizing" (i.e. selection of the minimum) step due to the random location of the peaks and dips of the sidelobes from each image, while the waveforms representing the two targets remain substantially unaffected.

FIG. 10 is a comparison of images of two targets generated after a series of three iterations using the principles of the present invention. FIG. 11 is a similar comparison of images of two targets after a more lengthy series of iterations (e.g. 1, 2, 3, 8, 20 and 50 iterations). The number of iterations shown and the choice of percentage of data points removed are merely exemplary and may vary depending upon the time and resources available, the quality desired and the nature of the target area.

FIG. 11a is a further illustration showing the effect of how changing the percentage of data points which are removed from the apertures affects the image.

Figure 13:
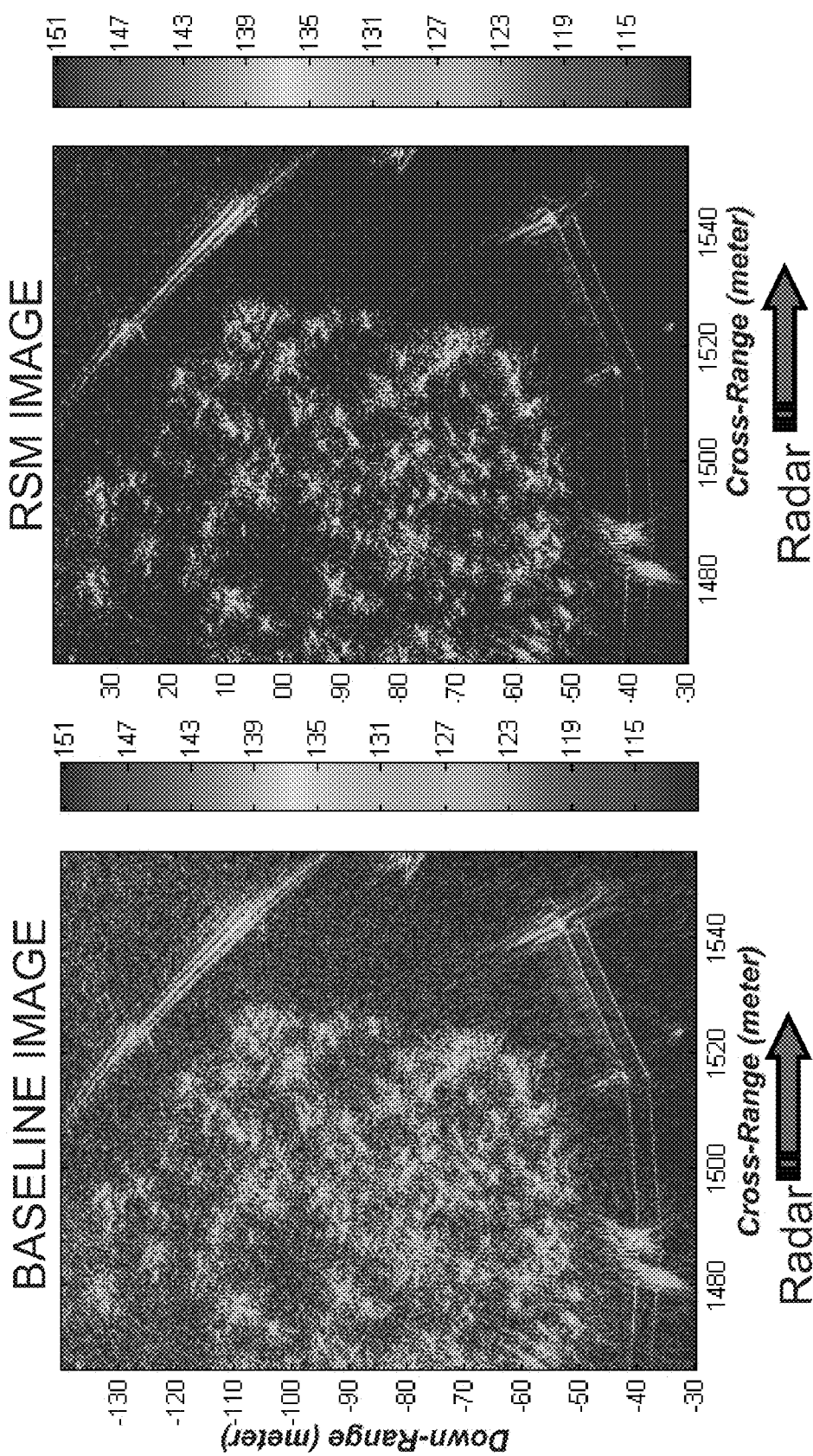
FIG. 13 is an illustration of recursive sidelobe minimization technique using data from ARL BoomSAR radar with a different geometry (side-looking mode) and different configuration.

Although the above description illustrates the application of the RSM technique for a preferred embodiment configuration (a UWB radar configured in forward-looking imaging mode), this RSM method could be applied to any coherent imaging system where measurements from an aperture of arbitrary geometry (linear, curve, 2-D, or 3-D) are coherently integrated to form a 2D or 3D image. FIG. 12 shows the "before" and "after" images when the RSM technique is applied to the SIRE radar data in forward-looking configuration. FIG. 13 illustrates a comparison of a baseline image (left) with an image (right) from a Recursive Sidelobe Minimization (RSM) preferred embodiment technique using data from another radar (e.g., BoomSAR) with a different geometry (side-looking SAR) and a single transmit antenna and single receive antenna in a pseudo-monostatic configuration.

A preferred embodiment code listing representative of the RSM algorithm is included in Appendix A. This pseudo code includes more details than the flowchart shown in FIG. 5. A variety of computer languages may be used in accordance with the principles of the present invention.

It should be emphasized that the above-described embodiments are merely possible examples of implementations. Many variations and modifications may be made to the above-described embodiments. All such modifications and variations are intended to be included herein within the scope of the disclosure and protected by the following claims. The term "processor" as used herein includes multiprocessors, computers, supercomputers, data processor, laptops, signal processors, personal computers, and/or any component which processes data. The term "image generator" as used herein includes a processor which generate images and/or any element or component, including components within a processor, which generate images. The term "comparator" as used herein means a component within a processor operative to complete a comparison function or a separate processor or component which compares sets of data in order to determine lesser or equal values.

The term "bitmap" is derived from a mapped array of bits, and bitmapped and pixmap refer to the similar concept of a spatially mapped array of pixels. The term "bitmapped" as used herein encompasses pixmap. The term "bitmapped" means a set of bits that represents a graphic image, with each bit or group of bits corresponding to a pixel. As used in the following claims, the term "bitmapped" encompasses all images formed using pixels. For example, all images acquired by digital cameras and camcorders, scanners, and screen capture programs are bitmapped images.

As used in the following claims, the term "processor" means one or more processing units, central processing units, processor cores, microprocessors, digital signal processors, multiprocessors, computers, and/or controllers, which may be connected together or to other circuitry in a manner known to those of ordinary skill in the art. As used in the foregoing claims, the terminology "area" includes object(s), person(s), setting, place, or scene. For example, "scanning an area" includes scanning an object or objects, person or persons, place or scene. The terminology positional data includes but is not limited to spatial information relating to location.

APPENDIX A

Pseudo code for forming image using the Recursive Sidelobe Minimization (RSM) technique.
%========== Get radar data, this block corresponds to step 1 of FIG. 5
Get radar data
%========== Form radar aperture, this block corresponds to step 2 of FIG. 5
Initialize variables for radar data
   NumSamps  number of samples per radar data record
   NumAps    number of aperture position
     xR[NumAps]   array of x-coordinates of radar receiving positions
     yR[NumAps]   array of y-coordinates of radar receiving positions
     zR[NumAps]   array of z-coordinates of radar receiving positions
     xT[NumAps]   array of x-coordinates of radar transmitting positions
     yT[NumAps]   array of y-coordinates of radar transmitting positions
     zT[NumAps]   array of z-coordinates of radar transmitting positions
     s[NumSamps][NumAps] 2-D array of radar data
     ts         sampling period of radar data (in second)
%========== apply the Recursive Sidelobe Minimization (RSM) technique to the radar data to form image
Initialize variables to define image grid    This correspond to step 4 of FIG. 5.
     nRange     Number of image pixels in range direction
     nXRange    Number of image pixels in cross-range direction
     rIncr       Image pixels spacing (meter) in range direction
     xrIncr     Image pixels spacing (meter) in cross-range direction
     xref       x-coordinate (in meter) of image center
     yref       y-coordinate (in meter) of image center
     zref       z-coordinate (in meter) of image center
     imenv[nRange][ nXRange] = 1e20     2-D array of image. Initialize image to very large number (infinity)
     percentExcise     Initialize the percentage of number of aperture

APPENDIX A-continued points to be excised for each iteration. Typical value is 20.
  NumApsExcise =integer(NumAps*percentExcise/100) Number of aperture points to be excised for each iteration
    nIteration        %==== Initialize the number of iterations. Typical value is 50. In practice, the number of iterations can be automatically generated by comparing the total image energy from one iteration to the next. If the reduction in energy is smaller than a specified threshold, the algorithm stops.
%====== Go through 'nIteration' iterations.
For i = 1 to nIteration
    %====== Generate an array of indices to be excised from the original aperture. This corresponds to step 4 of FIG. 5. The radar aperture locations to be excised are randomly generated. Thus, for each iteration, these locations will be different. The procedure is described in relation to Step 5 above.
        exciseIdx[NumApsExcise]=random generator (1,NumAps)    array of indices into the original aperture array to be excised (not being used for forming image). Note that the value of any element of this array ranges from 1 to NumAps. In addition, any two elements of this array do not have the same value.
    %====== Form the image for this $i^{th}$ iteration. This corresponds to step 5 of FIG. 5. The backprojection algorithm is performed as described in the foregoing.
The imaging result for this iteration is stored in variable im, which is a 2-D array im[nRange][nXRange]
        im = backprojection (radar data, image grid, exciseIdx)
Note that the array exciseIdx is used as the input to the backprojection algorithm, which will discard the aperture positions in the exciseIdx list.
    %===== Compute envelope of the $i^{th}$ iteration image. This corresponds to step 6 of FIG. 5. The envelope procedure is described in the foregoing.
        imenv1 = envelope (im)
    %===== Perform the minimum operation between this $i^{th}$ iteration image to the intermediate resulting image from the previous iteration. This corresponds to step 7 of FIG. 5.
        imenv = minimum (imenv1, imenv)
        Note that imenv from the previous iteration is used as the input of the minimum operator (second operand). After the minimum operation, imenv is overwritten with the new result and this will be used as input for the next iteration.
    %=====Display intermediate result. This correspond to step 8 of FIG. 5.
        Display (imenv)
End For Loop

The invention claimed is:

1. A method for generating images from projection data comprising:

scanning an area using at least one data receiving element to obtain first values representing combined positional and recorded data; each of said first values forming a point in an array of k data points; the first point in the array representing the positional information and the recorded data obtained during the first increment; the $k^{th}$ data point in the array representing the combined positional information and recorded data obtained by the at least one data receiving element during the $k^{th}$ increment; where k is a number greater than 1;

removing approximately twenty to fifty percent of the data points from the array;

forming a first preliminary bit-mapped image using the reduced array of data points;

forming a second array by removing approximately twenty to fifty percent of the data points from the array;

forming a second preliminary bit-mapped image using the second array of data points;

generating a combined image by comparing each bit-mapped location of the first and second preliminary images and removing any pixel value which is greater in value at respective bit mapped locations to form a merged image of lesser or equal value pixels;

subsequently repeating the steps of removing approximately twenty to fifty percent of the data points from the array to form a reduced array, and forming a subsequent preliminary image from the reduced array, and generating a merged image by comparing the pixel values of the subsequent preliminary image to the preceding merged image, eliminating the greater values, and forming a subsequent combined image from the resulting lesser or equal pixel values;

whereby the steps are repeated over a series of iterations until the desired image resolution is obtained.

2. The method of claim 1 wherein the at least one data receiving element is a radar receiving element and each first value represents a radar return signal obtained by a radar receiving element located at a position represented by the positional data, and wherein the positional data comprises the coordinates of the radar receiving element.

3. The method of claim 1 wherein the array of k data points represents radar data obtained by an array of k radar receivers, each row of data being derived from a separate radar receiver, and wherein columns may be formed in the array comprising data from a different time interval in which data is received by each of the k radar receivers.

4. The method of claim 1 wherein the step of removing twenty to fifty percent of the data points from the array to form a reduced array comprises removing the same predetermined percentage of data points each time with the selection of the data points subject to removal being computer generated.

5. The method of claim 1 wherein the step of removing twenty to fifty percent of the data points from the array to form a reduced array comprises removing a varying percentage of data points each time with the selection of the data points subject to removal being random.

6. The method of claim 1 wherein each time the step of removing approximately twenty to fifty percent of the data points from the array comprises removing a predetermined percentage of data points each time from random locations within the array, such that each time the step is performed, substantially the same number of data points at substantially a different set of locations is removed.

7. The method of claim 1 wherein the formation of the bit-mapped image is accomplished using a Fourier transform technique.

8. The method of claim 1 wherein a target can be located by inputting data from two receiving elements, determining the respective angles from signals reflected from the target obtained by both receiving elements, and determining the target location based upon the angles at which the signals are reflected, the time at which the signal is received, and the positional information of the receiving elements.

9. The method of claim 1 wherein each data receiving element scans substantially the same area and three dimensional images are obtained using signal data from each receiving element that includes the magnitude of the signal, the angle from which the signal was derived, the time of receipt, and the positional information of the receiving element.

10. The method of claim 1 wherein the at least one data receiving element comprises an array of receiving elements that scan substantially the same area during a second time period, said second time period substantially overlaps the first time period, and wherein the step of forming a preliminary image comprises forming a preliminary image using a regenerative technique.

11. The method of claim 10 wherein each time the step of removing approximately twenty to fifty percent of the data points from the array comprises removing a predetermined percentage of data points each time from random locations within the array, such that each time the step is performed, substantially the same number of data points at substantially a different set of locations is removed.

12. The method of claim 1 wherein the image is developed from the image points using back projection.

13. The method of claim 1 wherein the electromagnetic signals used to generate the image are susceptible to internal and external noise sources, and when a transmitted electromagnetic signal encounters a physical element within the targeted area, the resulting image comprises at least one response lobe and side lobes from the physical element, and noise signals.

14. The method of claim 13 wherein the reduction of noise is achieved by reducing the level of the sidelobes and noise signals.

15. The method of claim 14 wherein the at least one data receiving element comprises multiple receiving elements and the reception of signals varying in intensity from different combinations of receiver elements and location changes results in variances in the sidelobes and noise signals while the at east one response lobe from the physical element remains substantially unchanged;

whereby the removal of the data points from each array and the generating of merged images using pixel values of lesser or equal values effectively diminish the effect of the sidelobes and noise signals in the resulting image.

16. A signal processing system for removing unwanted noise in the generation of an image using electromagnetic signals comprising:

at least one receiving element for receiving signal data at different positions 1 though k;

a processor for forming a first array of data points 1 though k; each data point comprising positional information representing the location of the at least one receiving element and signal data received by the at least one receiving element; the processor operating to remove a percentage of the data points from the first array in the range of approximately 20 to 50 percent to form a second array, and generate a first preliminary image from the second array;

the processor operating to randomly or arbitrarily remove a percentage of data points in the range of 20 to 50 percent from the first array to form a series of arrays, each array in the series generally containing a substantially different set of data points;

an image generator for generating preliminary images from each array in the series of arrays;

a comparator for comparing the pixel values at each bitmapped location for at least two preliminary images and outputting the lesser or equal pixel value for each respective bitmapped location;

the image generator operating to generate a merged image from the output of the comparator; the comparator further operating to compare a series of preliminary images with a merged image iteratively; each time outputting the lesser or equal pixel value for each respective bitmapped location to form a merged image and iteratively comparing another in the series of preliminary images with the merged image;

a display for displaying the merged image.

17. The system of claim 16 wherein the electromagnetic signals are radar signals and when a transmitted electromagnetic signal encounters a physical element within the targeted area, the resulting image comprises at least one response lobe and side lobes from the physical element, and noise signals, and wherein the comparator operates to reduce the noise by diminishing the effect of the sidelobes and noise signals.

18. The system of claim 17 wherein the image generator utilizes a back projection method and wherein the at least one data receiving element comprises an array of receiving elements that scan substantially the same area.

19. A method for generating images from projection data comprising:

inputting projection data from at least one receiving element;

generating a first array comprising data points containing positional and signal data received from the at least one receiving element;

arbitrarily removing data points from the first array to form a series of subarrays; each subarray generally being composed of different sets of data points;

generating preliminary images from the subarrays;

comparing the corresponding bitmapped locations from two preliminary images to determine bitmapped locations to determine the lesser or equal pixel values;

forming a merged image from the lesser or equal pixel values;

comparing the corresponding bitmapped locations of another preliminary image to the merged image to determine the lesser or equal pixel values; and forming a merged image from the lesser or equal pixel values;

repeating the comparing of corresponding bitmapped locations of another preliminary image to the last merged image to form a subsequent merged image until the desired image quality is obtained.

20. The method of claim 19 wherein the projection data is in the form of electromagnetic signals.

* * * * *